United States Patent
Yamamoto

(10) Patent No.: US 9,501,646 B2
(45) Date of Patent: Nov. 22, 2016

(54) PROGRAM VERIFICATION APPARATUS, PROGRAM VERIFICATION METHOD, AND COMPUTER READABLE MEDIUM

(71) Applicant: Mitsubishi Electric Corporation, Chiyoda-ku (JP)

(72) Inventor: Takumi Yamamoto, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/421,649

(22) PCT Filed: Aug. 30, 2013

(86) PCT No.: PCT/JP2013/073316
§ 371 (c)(1),
(2) Date: Feb. 13, 2015

(87) PCT Pub. No.: WO2014/050431
PCT Pub. Date: Apr. 3, 2014

(65) Prior Publication Data
US 2015/0302202 A1  Oct. 22, 2015

(30) Foreign Application Priority Data

Sep. 26, 2012 (JP) .................................. 2012-211991

(51) Int. Cl.
*G06F 12/14* (2006.01)
*G06F 21/57* (2013.01)
*G06F 21/54* (2013.01)

(52) U.S. Cl.
CPC ............... *G06F 21/57* (2013.01); *G06F 21/54* (2013.01); *G06F 21/577* (2013.01); *G06F 2221/033* (2013.01)

(58) Field of Classification Search
None
See application file for complete search history.

(56) References Cited

U.S. PATENT DOCUMENTS

2005/0251853 A1  11/2005  Bhargavan et al.
2005/0268326 A1  12/2005  Bhargavan et al.
(Continued)

FOREIGN PATENT DOCUMENTS

JP  09-101880 A  4/1997
JP  2004-287810 A  10/2004
(Continued)

OTHER PUBLICATIONS

International Search Report issued Nov. 12, 2013 in PCT/JP2013/073316 filed Aug. 30, 2013.
(Continued)

*Primary Examiner* — Brandon Hoffman
(74) *Attorney, Agent, or Firm* — Oblon, McClelland, Maier & Neustadt, L.L.P.

(57) ABSTRACT

A necessary information extraction unit extracts, from variables used in a target program, an output variable to which output information to be output by an output function defined in an output function list is set. The necessary information extraction unit extracts, from the variables used in the target program, an encryption variable to which encrypted information encrypted by an encrypting function defined in an encryption function list is set. A protected state analysis unit refers to an assignment statement included in the target program, and extracts an encrypted state variable to which the encrypted information is assigned. A vulnerability determination unit determines whether or not the encrypted state variable and the output variable are the same variable, and outputs a program verification result based on a result of determination.

8 Claims, 26 Drawing Sheets

(56) References Cited

U.S. PATENT DOCUMENTS

| | | | |
|---|---|---|---|
| 2005/0273854 A1 | 12/2005 | Chess et al. | |
| 2005/0273859 A1 | 12/2005 | Chess et al. | |
| 2005/0273860 A1 | 12/2005 | Chess et al. | |
| 2005/0273861 A1 | 12/2005 | Chess et al. | |
| 2007/0107057 A1 | 5/2007 | Chander et al. | |
| 2007/0157310 A1 | 7/2007 | Kondo et al. | |
| 2007/0240138 A1 | 10/2007 | Chess et al. | |
| 2009/0138729 A1 | 5/2009 | Hashimoto et al. | |
| 2010/0083240 A1 | 4/2010 | Siman | |
| 2010/0257603 A1 | 10/2010 | Chander et al. | |
| 2012/0066770 A1* | 3/2012 | Hayashi | G06F 21/52 726/26 |
| 2013/0167241 A1 | 6/2013 | Siman | |

FOREIGN PATENT DOCUMENTS

| | | |
|---|---|---|
| JP | 2005-222341 A | 8/2005 |
| JP | 2005-322234 A | 11/2005 |
| JP | 2006-155416 A | 6/2006 |
| JP | 2007-122745 A | 5/2007 |
| JP | 2007-233432 A | 9/2007 |
| JP | 2008-502046 A | 1/2008 |
| JP | 2008-299723 A | 12/2008 |
| JP | 2009-129206 A | 6/2009 |
| JP | 2009-521737 A | 6/2009 |
| JP | 2010-507165 A | 3/2010 |

OTHER PUBLICATIONS

Ikuo Nakata, "Compiler construction and optimization", Asakura Shoten, ISBN4-254-12139-3, Sep. 1999, p. 288-289 and Cover Pages.

Takumi Yamamoto, et al., "An evaluation on analysis system of web application I/O" Proceedings of the 2012 IEICE General Conference, Mar. 2012, p. 33 and Cover Pages.

Takumi Yamamoto, et al., "An implementation and evaluation of verification method for appropriateness of encrypting processes in Android Applications", IPSJ SIG Technical Report, Mar. 2013, pp. 1-8 with English Abstract.

Extended European Search Report issued Mar. 24, 2016 in Patent Application No. 13842867.7.

* cited by examiner

```
1:   profile = getProfile();    // Profile OBJECT OF Profile CLASS
2:   name = profile.getName();
3:   age = profile.getAge();
4:   sex = profile.getSex();
5:   address = profile.getAddress();
6:   tel = profile.getAddress();
7:   mail = profile.getMail();
8:
9:   output(name, age, sex)
10:  post(address, tel, mail)
```

| No | FUNCTION NAME | PROTECTION TARGET INFORMATION |
|---|---|---|
| 1 | getProfile | PROFILE |
| 2 | Profile::getName | NAME |
| 3 | Profile::getAge | AGE |
| 4 | Profile::getSex | SEX |
| 5 | Profile::getAddress | ADDRESS |
| 6 | Profile::getTel | TELEPHONE NUMBER |
| 7 | Profile::getMail | MAIL ADDRESS |
| 8 | ・・・ | BIOMETRIC INFORMATION |
| 9 | ・・・ | PASSWORD |
| 10 | ・・・ | KEY |
| ・・・ | ・・・ | ・・・ |

| No | VARIABLE NAME | POSITION (LINE NUMBER) | PROTECTION TARGET INFORMATION | INFORMATION STATE |
|---|---|---|---|---|
| 1 | profile | 1 | PROFILE | PLAINTEXT |
| 2 | name | 2 | NAME | PLAINTEXT |
| 3 | age | 3 | AGE | PLAINTEXT |
| 4 | sex | 4 | SEX | PLAINTEXT |
| 5 | address | 5 | ADDRESS | PLAINTEXT |
| 6 | tel | 6 | TELEPHONE NUMBER | PLAINTEXT |
| 7 | mail | 7 | MAIL ADDRESS | PLAINTEXT |

| No | FUNCTION NAME | OUTPUT CONTENT | OUTPUT STATE |
|---|---|---|---|
| 1 | output | FILE OUTPUT | PLAINTEXT |
| 2 | post | COMMUNICATION | PLAINTEXT |
| 3 | ssl | ENCRYPTED COMMUNICATION | ENCRYPTED TEXT |
| 4 | ... | ... | ... |
| 5 | ... | ... | ... |
| ... | ... | ... | ... |

| No | FUNCTION NAME | POSITION (LINE NUMBER) | ACTUAL ARGUMENT | OUTPUT STATE |
|---|---|---|---|---|
| 1 | output | 9 | name, age, sex | PLAINTEXT |
| 2 | post | 10 | address, tel, mail | PLAINTEXT |

```
 1: profile = getProfile();    // Profile OBJECT OF Profile CLASS
 2: name = profile.getName();
 3: age = profile.getAge();
 4: sex = profile.getSex();
 5: address = profile.getAddress();
 6: tel = profile.getAddress();
 7: mail = profile.getMail();
 8: key = 12345
 9: enc_tel = enc(tel, key)
10: post(enc_tel)
```

| No | FUNCTION NAME | KEY POSITION | PROCESSING CONTENT |
|---|---|---|---|
| 1 | enc | SECOND ARGUMENT | ENCRYPTION |
| 2 | dec | SECOND ARGUMENT | DECRYPTION |
| 3 | ... | ... | ... |
| ... | ... | ... | ... |

| No | FUNCTION NAME | POSITION (LINE NUMBER) | ACTUAL ARGUMENTS OF FUNCTION | ACTUAL ARGUMENT FOR KEY | VARIABLE FOR OUTPUT | OUTPUT STATE |
|---|---|---|---|---|---|---|
| 1 | enc | 9 | tel, key | key | enc_tel | ENCRYPTED TEXT |

```
1:  profile = getProfile();    // Profile  OBJECT OF Profile CLASS
2:  name = profile.getName();
3:  age = profile.getAge();
4:  key = 12345;
5:  h_key = hash(key);
6:  enc_tel = enc(name, key);
```

| No | VARIABLE NAME | POSITION (LINE NUMBER) | CONTENT OF VARIABLE |
|---|---|---|---|
| 1 | profile | 1 | VARIABLE |
| 2 | name | 2 | VARIABLE |
| 3 | age | 3 | VARIABLE |
| 4 | key | 4 | INVARIABLE |
| 5 | key | 5 | INVARIABLE |
| 6 | h_key | 5 | INVARIABLE |
| 7 | name | 6 | VARIABLE |
| 8 | key | 6 | INVARIABLE |
| 9 | enc_tel | 6 | VARIABLE |

| No | VARIABLE NAME | POSITION (LINE NUMBER) | INFORMATION | INFORMATION STATE |
|---|---|---|---|---|
| 1 | profile | 1 | PROFILE | PLAINTEXT |
| 2 | name | 2 | NAME | PLAINTEXT |

| LINE NUMBER | PLAINTEXT | ENCRYPTED TEXT |
|---|---|---|
| FIRST LINE | profile | |
| SECOND LINE | name | |

| LINE NUMBER | PLAINTEXT | ENCRYPTED TEXT |
|---|---|---|
| FIRST LINE | profile | |
| SECOND LINE | profile, name | |

```
1:  profile = getProfile();    // Profile OBJECT OF Profile CLASS
2:  name = profile.getName();
3:  name1 = name
4:  seed = 12345;
5:  in = input();
6:  key = seed
7:  enc_name = enc(name1, key)
8:  post(enc_name)
```

| LINE NUMBER | PLAINTEXT | ENCRYPTED TEXT |
|---|---|---|
| FIRST LINE | profile | |
| SECOND LINE | profile, name | |
| THIRD LINE | profile, name, name1 | |
| FOURTH LINE | profile, name, name1 | |
| FIFTH LINE | profile, name, name1 | |
| SIXTH LINE | profile, name, name1 | |
| SEVENTH LINE | profile, name, name1, key | enc_name (enc IN SEVENTH LINE) |

| LINE NUMBER | PLAINTEXT | ENCRYPTED TEXT |
|---|---|---|
| FIRST LINE | profile | |
| SECOND LINE | profile, name | |
| THIRD LINE | profile, name, name1 | |

| No | FUNCTION NAME | POSITION (LINE NUMBER) | ACTUAL ARGUMENT OF FUNCTION | ACTUAL ARGUMENT FOR KEY | VARIABLE FOR OUTPUT | OUTPUT STATE |
|---|---|---|---|---|---|---|
| 1 | enc | 7 | name1, key | key | enc_name | ENCRYPTED TEXT |

| LINE NUMBER | PLAINTEXT | ENCRYPTED TEXT |
|---|---|---|
| FIRST LINE | profile | |
| SECOND LINE | profile, name | |
| THIRD LINE | profile, name, name1 | |
| FOURTH LINE | profile, name, name1 | |
| FIFTH LINE | profile, name, name1 | |
| SIXTH LINE | profile, name, name1 | |
| SEVENTH LINE | profile, name, name1, key | enc_name (enc IN SEVENTH LINE) |
| EIGHTH LINE | profile, name, name1, key | enc_name (enc IN SEVENTH LINE) |

```
1:  profile = getProfile();    // Profile OBJECT OF Profile CLASS
2:  name = profile.getName();
3:  name1 = name
4:  seed = 12345;
5:  in = input();
6:  key = hash(in + seed)
7:  enc_name1 = enc(name1, key)
8:  enc_name2 = enc_name1
9:  dec_name = dec(enc_name2, key)
```

| No | VARIABLE NAME | POSITION (LINE NUMBER) | INFORMATION | INFORMATION STATE |
|---|---|---|---|---|
| 1 | profile | 1 | PROFILE | PLAINTEXT |
| 2 | name | 2 | NAME | PLAINTEXT |

| No | FUNCTION NAME | POSITION (LINE NUMBER) | ACTUAL ARGUMENT OF FUNCTION | ACTUAL ARGUMENT FOR KEY | VARIABLE FOR OUTPUT | OUTPUT STATE |
|---|---|---|---|---|---|---|
| 1 | enc | 7 | name1, key | key | enc_name | ENCRYPTED TEXT |
| 2 | dec | 9 | enc_name2, key | key | dec_name | PLAINTEXT |

| LINE NUMBER | PLAINTEXT | ENCRYPTED TEXT |
|---|---|---|
| FIRST LINE | profile | |
| SECOND LINE | profile, name | |
| THIRD LINE | profile, name, name1 | |
| FOURTH LINE | profile, name, name1 | |
| FIFTH LINE | profile, name, name1 | |
| SIXTH LINE | profile, name, name1 | |
| SEVENTH LINE | profile, name, name1, key | enc_name1 (enc IN SEVENTH LINE) |
| EIGHTH LINE | profile, name, name1, key | enc_name1 (enc IN SEVENTH LINE), enc_name2 (enc IN SEVENTH LINE) |
| NINTH LINE | profile, name, name1, key, dec_name (dec IN NINTH LINE) | enc_name1 (enc IN SEVENTH LINE), enc_name2 (enc IN SEVENTH LINE) |

| No | POSITION (LINE NUMBER) | KEY VARIABLE | OPERATOR (FUNCTION NAME) | CONTENT |
|---|---|---|---|---|
|  |  |  |  |  |

| No | FUNCTION NAME | POSITION (LINE NUMBER) | ACTUAL ARGUMENT OF FUNCTION | ACTUAL ARGUMENT FOR KEY | VARIABLE FOR OUTPUT | OUTPUT STATE |
|---|---|---|---|---|---|---|
| 1 | enc | 7 | profile, key2 | key2 | enc_name | ENCRYPTED TEXT |

| No | VARIABLE NAME | POSITION (LINE NUMBER) | CONTENT |
|---|---|---|---|
| 1 | profile | 1 | VARIABLE |
| 2 | seed1 | 2 | INVARIABLE |
| 3 | seed2 | 3 | INVARIABLE |
| 4 | in | 4 | VARIABLE |
| 5 | seed1 | 5 | INVARIABLE |
| 6 | in | 5 | VARIABLE |
| 7 | key1 | 5 | VARIABLE |
| 8 | key1 | 6 | VARIABLE |
| 8 | seed2 | 6 | INVARIABLE |
| 9 | key2 | 6 | VARIABLE |
| 10 | profile | 7 | VARIABLE |
| 11 | key2 | 7 | VARIABLE |
| 12 | enc_name | 7 | VARIABLE |

```
1:  profile = getProfile();    // Profile OBJECT OF Profile CLASS
2:  seed1 = 12345;
3:  seed2 = 98765;
4:  in = input();
5:  key1 = hash(in + seed1)
6:  key2 = key1 xor seed2
7:  enc_name = enc(profile, key2)
```

| No | POSITION (LINE NUMBER) | KEY VARIABLE | OPERATOR (FUNCTION NAME) | CONTENT |
|---|---|---|---|---|
| 1 | 7 | key2 | xor, hash, + | VARIABLE |

| No | FUNCTION NAME | POSITION (LINE NUMBER) | ACTUAL ARGUMENT | OUTPUT STATE |
|---|---|---|---|---|
| 1 | post | 8 | enc_name | PLAINTEXT |

| No | POSITION (LINE NUMBER) | KEY VARIABLE | OPERATOR (FUNCTION NAME) | CONTENT |
|---|---|---|---|---|
| 1 | 7 | key | NONE | INVARIABLE |

PROGRAM VERIFICATION APPARATUS, PROGRAM VERIFICATION METHOD, AND COMPUTER READABLE MEDIUM

TECHNICAL FIELD

The present invention relates to a program verification apparatus, a program verification method, and a program verification program for verifying reliability of a program, for example.

BACKGROUND ART

Among technologies for verifying reliability of a program, there is a method of finding out vulnerability whereby important information such as confidential information or personal information flows out to an outside (such as the Internet, a different program, a different file, or a database) due to the program.

In the conventional technology, the program is analyzed by paying attention to a data flow alone. Thus, a case where appropriately encrypted information is sent out to the outside is also erroneously detected as the vulnerability.

From a standpoint of a program developer, it is not desirable that the vulnerability be erroneously detected from the program that has been safely implemented. On the other hand, from a standpoint of a user, there is a need for checking whether or not important information of his own is appropriately being handled in the program.

Herein, "the important information is appropriately being handled" means that the following conditions are satisfied:
  the important information is not output to the outside from the program still as a plaintext; and
  when the important information is encrypted, a key used for the encryption is not hard-coded (constantized) within the program.

CITATION LIST

Patent Literature

Patent Literature 1: JP 2010-507165
Patent Literature 2: JP 2008-502046

Non-Patent Literature

Non-Patent Literature 1: Ikuo Nakata, "Compiler Construction and Optimization", Asakura Shoten, September 1999, ISBN4-254-12139-3

SUMMARY OF INVENTION

Technical Problem

An object of the present invention is to verify whether or not information to be output by a target program that is a verification target, is information to be output after encryption.

Solution to Problem

A program verification apparatus of the present invention includes:
  a program input unit that inputs a program using variables, an output function, and an encrypting function and including an assignment statement;
  an output variable extraction unit that extracts from the program an output variable to which output information to be output by the output function is set;
  an encryption variable extraction unit that extracts from the program an encryption variable to which encrypted information encrypted by the encrypting function is set;
  an encrypted state variable extraction unit that refers to the assignment statement included in the program and extracts from the program an encrypted state variable to which the encrypted information is assigned, the encrypted information being set to the encryption variable extracted by the encryption variable extraction unit;
  an encrypted state determination unit that determines whether or not the encrypted state variable extracted by the encrypted state variable extraction unit and the output variable extracted by the output variable extraction unit are the same variable; and
  a verification result output unit that outputs a verification result of the program, based on a result of determination by the encrypted state determination unit.

Advantageous Effects of Invention

According to the present invention, it may be verified, for example, whether or not information to be output by a target program that is a verification target is information to be output after encryption.

BRIEF DESCRIPTION OF DRAWINGS

FIG. 7 is a diagram illustrating an example of a target program 101 in the first embodiment.

FIG. 8 is a table illustrating an example of an information acquisition function list 181 in the first embodiment.

FIG. 9 is a table illustrating an example of a protection target extraction list 191 in the first embodiment.

FIG. 10 is a table illustrating an example of an output function list 182 in the first embodiment.

FIG. 11 is a table illustrating an example of an output function extraction list 192 in the first embodiment.

FIG. 12 is a diagram illustrating an example of the target program 101 in the first embodiment.

FIG. 13 is a table illustrating an example of an encryption function list 183 in the first embodiment.

FIG. 14 is a table illustrating an example of an encryption function extraction list 193 in the first embodiment.

FIG. 15 is a diagram illustrating an example of the target program 101 in the first embodiment.

FIG. 16 is a table illustrating an example of a variable information extraction list 194 in the first embodiment.

FIG. 19 is a table illustrating an example of the protection target extraction list 191 in the first embodiment.

FIG. 20 is a table illustrating an example of initialization of a protection target state management table 195 in the first embodiment.

FIG. 21 is a table illustrating an example of the protection target state management table 195 in the first embodiment.

FIG. 22 is a diagram illustrating an example of the target program 101 in the first embodiment.

FIG. 23 is a table illustrating an example of the protection target state management table 195 in the first embodiment.

FIG. 24 is a table illustrating an example of the protection target state management table 195 in the first embodiment.

FIG. 25 is a table illustrating an example of the encryption function extraction list 193 in the first embodiment.

FIG. 26 is a table illustrating an example of the protection target state management table 195 in the first embodiment.

FIG. 27 is a diagram illustrating an example of the target program 101 in the first embodiment.

FIG. 28 is a table illustrating an example of the protection target extraction list 191 in the first embodiment.

FIG. 29 is a table illustrating an example of the encryption function extraction list 193 in the first embodiment.

FIG. 30 is a table illustrating an example of the protection target state management table 195 in the first embodiment.

FIG. 32 is a configuration diagram of a key state management table 196 in the first embodiment.

FIG. 33 is a table illustrating an example of the encryption function extraction list 193 in the first embodiment.

FIG. 34 is a table illustrating an example of the variable information extraction list 194 in the first embodiment.

FIG. 35 is a diagram illustrating an example of the target program 101 in the first embodiment.

FIG. 36 is a table illustrating an example of a key state management table 196 in the first embodiment.

FIG. 39 is a table illustrating an example of the output function extraction list 192 in the first embodiment.

FIG. 40 is a table illustrating an example of the key state management table 196 in the first embodiment.

DESCRIPTION OF EMBODIMENTS

First Embodiment

A description will be directed to an embodiment for verifying whether or not a program to be verified is a program whereby information to be protected is output after having been appropriately encrypted.

Figure 1:
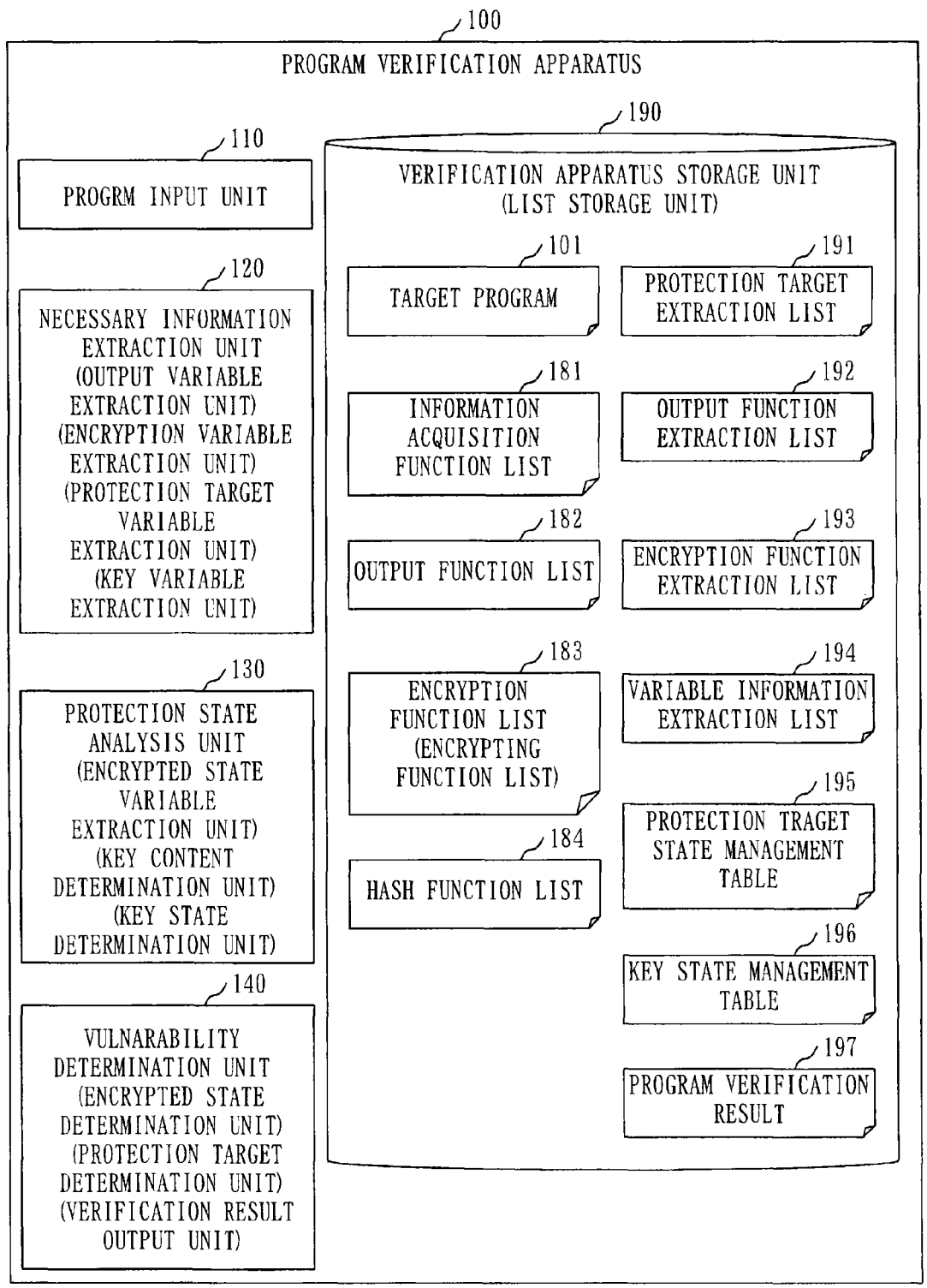
FIG. 1 is a configuration diagram of a program verification apparatus 100 in a first embodiment.

FIG. 1 is a configuration diagram of a program verification apparatus 100 in a first embodiment.

The program verification apparatus 100 in the first embodiment will be described, based on FIG. 1.

The program verification apparatus 100 is a computer that verifies whether a program to be verified is a program with high reliability whereby information to be protected is output after having been protected by encryption. The information is also referred to as data (the same applied hereinafter).

Hereinafter, the program to be verified will be referred to as a "target program 101" and the information to be protected will be referred to as "protection target information".

The program verification apparatus 100 (an example of a program verification apparatus) includes a program input unit 110, a necessary information extraction unit 120, a protection state analysis unit 130, a vulnerability determination unit 140, and a verification apparatus storage unit 190.

Each component of the program verification apparatus 100 will be outlined below. Details of each component of the program verification apparatus 100 will be described later.

The program input unit 110 (an example of a program input unit) inputs the target program 101.

The necessary information extraction unit 120 (an example of an output variable extraction unit, an encryption variable extraction unit, a protection target variable extraction unit, and a key variable extraction unit) extracts various information necessary for verification from the target program 101 input by the program input unit 110.

The necessary information extraction unit 120 generates a protection target extraction list 191, an output function extraction list 192, an encryption function extraction list 193, and a variable information extraction list 194, as a result of extraction of the various information.

The protection target extraction list 191 is a list of variable names of variables for the protection target information.

The output function extraction list 192 is a list of function names of output functions for outputting the information.

The encryption function extraction list 193 is a list of function names of encryption functions for encrypting (or decrypting) the information.

The variable information extraction list 194 is a list of variable names of variables.

The protection state analysis unit 130 (an example of an encrypted state variable extraction unit, a key content determination unit, and a key state determination unit) analyzes the target program 101 with respect to a protection state of the protection target information, based on the result of extraction of the various information by the necessary information extraction unit 120.

The protection state analysis unit 130 generates each of a protection target state management table 195 and a key state management table 196, based on a result of analysis.

The protection target state management table 195 is a list indicating whether or not the protection target information is encrypted, for each variable for the protection target information.

The key state management table 196 is a list indicating whether or not an encryption key is protected for each encryption key used for encryption.

The vulnerability determination unit 140 (an example of an encrypted state determination unit, a protection target determination unit, and a verification result output unit) determines a vulnerable element included in the target program 101 based on the result of analysis of the target program 101 by the protection state analysis unit 130, and outputs a result of determination as a program verification result 197.

The more the protection target information to be output without being appropriately encrypted is, the more the target program 101 is vulnerable. The less the protection target information to be output without being appropriately encrypted is, the higher the reliability of the target program 101 is.

The verification apparatus storage unit 190 (an example of a list storage unit) stores data to be used for the program verification apparatus 100.

To take an example, the verification apparatus storage unit 190 stores the following data.

The verification apparatus storage unit 190 stores the target program 101 input by the program input unit 110.

The verification apparatus storage unit 190 stores an information acquisition function list 181, an output function list 182, an encryption function list 183, and a hash function list 184 in advance.

The verification apparatus storage unit 190 stores the protection target extraction list 191, the output function extraction list 192, the encryption function extraction list 193, and the variable information extraction list 194 generated by the necessary information extraction unit 120.

The verification apparatus storage unit 190 stores the protection target state management table 195 and the key state management table 196 generated by the protection state analysis unit 130.

The verification apparatus storage unit 190 stores the program verification result 197 generated by the vulnerability determination unit 140.

The information acquisition function list 181 (an example of an information acquisition function list) is a list that defines each information acquisition function for acquiring the protection target information, and is used for generating the protection target extraction list 191.

The output function list 182 (an example of an output function list) is a list that defines each output function for outputting the information, and is used for generating the output function extraction list 192.

The encryption function list 183 (an example of an encryption function list) is a list that defines each encryption function for encrypting (or decrypting) the information, and is used for generating the encryption function extraction list 193.

The hash function list 184 is a list of cryptographic hash functions (such as SHA1 and MD5) capable of being commonly used and is used for generating the key state management table 196.

Figure 2:
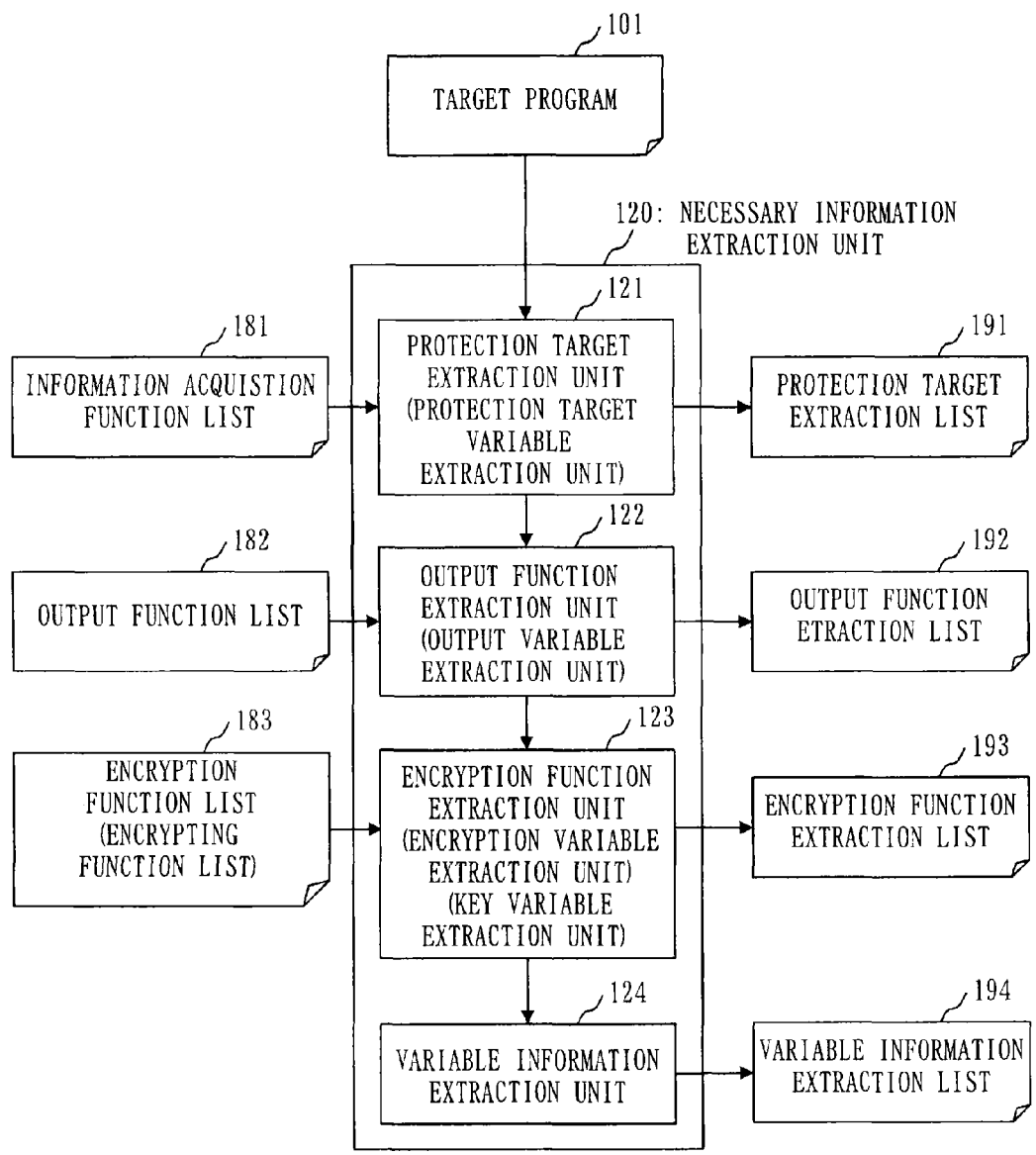
FIG. 2 is a configuration diagram of a necessary information extraction unit 120 in the first embodiment.

FIG. 2 is a configuration diagram of the necessary information extraction unit 120 in the first embodiment.

A configuration of the necessary information extraction unit 120 in the first embodiment will be described, based on FIG. 2.

The necessary information extraction unit 120 includes a protection target extraction unit 121, an output function extraction unit 122, an encryption function extraction unit 123, and a variable information extraction unit 124.

Each component of the necessary information extraction unit 120 will be outlined below. Details of each component of the necessary information extraction unit 120 will be described later.

The protection target extraction unit 121 (an example of the protection target variable extraction unit) extracts a variable for the protection target information from the target program 101 based on the information acquisition function list 181, and generates the protection target extraction list 191 listing the extracted variable.

The output function extraction unit 122 (an example of the output variable extraction unit) extracts an output function from the target program 101, based on the output function list 182, and generates the output function extraction list 192 listing the extracted output function.

The encryption function extraction unit 123 (an example of the encryption variable extraction unit and the key variable extraction unit) extracts an encryption function from the target program 101, based on the encryption function list 183, and generates the encryption function extraction list 193 listing the extracted encryption function.

The variable information extraction unit 124 extracts a variable from the target program 101, and generates the variable information extraction list 194 listing the extracted variable.

Figure 3:
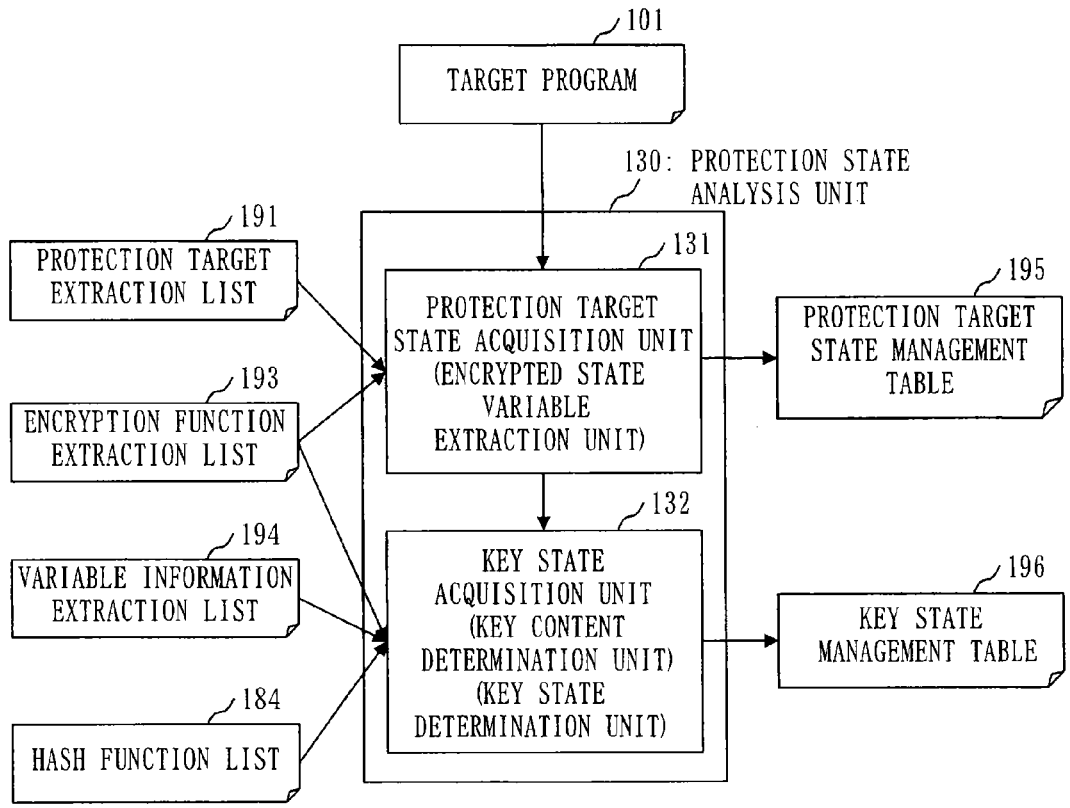
FIG. 3 is a configuration diagram of a protection state analysis unit 130 in the first embodiment.

FIG. 3 is a configuration diagram of the protection state analysis unit 130 in the first embodiment.

A configuration of the protection state analysis unit 130 in the first embodiment will be described, based on FIG. 3.

The protection state analysis unit 130 includes a protection target state acquisition unit 131 and a key state acquisition unit 132.

Each component of the protection state analysis unit 130 will be outlined below. Details of each component of the protection state analysis unit 130 will be described later.

The protection target state acquisition unit 131 (an example of the encrypted state variable extraction unit) analyzes the target program 101, based on the protection target extraction list 191 and the encryption function extraction list 193, and generates the protection target state management table 195 indicating whether or not the protection target information set to each variable is encrypted, for each variable for the protection target information.

The key state acquisition unit 132 (an example of the key content determination unit and the key state determination unit) analyzes the target program 101, based on the encryption function extraction list 193, the variable information extraction list 194, and the hash function list 184, and generates the key state management table 196 indicating whether or not each encryption key is protected, for each encryption key used for encryption.

Figure 4:
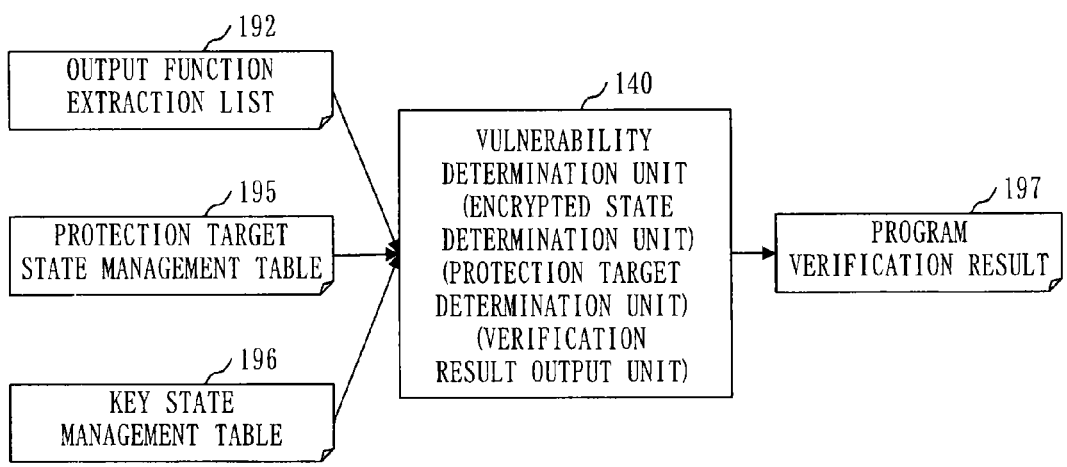
FIG. 4 is a schematic diagram of a vulnerability determination unit 140 in the first embodiment.

FIG. 4 is a schematic diagram of the vulnerability determination unit 140 in the first embodiment.

The vulnerability determination unit 140 in the first embodiment will be outlined, based on FIG. 4.

The vulnerability determination unit 140 (an example of the encrypted state determination unit, the protection target determination unit, and the verification result output unit) determines the vulnerable element included in the target program 101, based on the output function extraction list 192, the protection target state management table 195, and the key state management table 196, and outputs the program verification result 197 indicating the result of determination.

Figure 5:
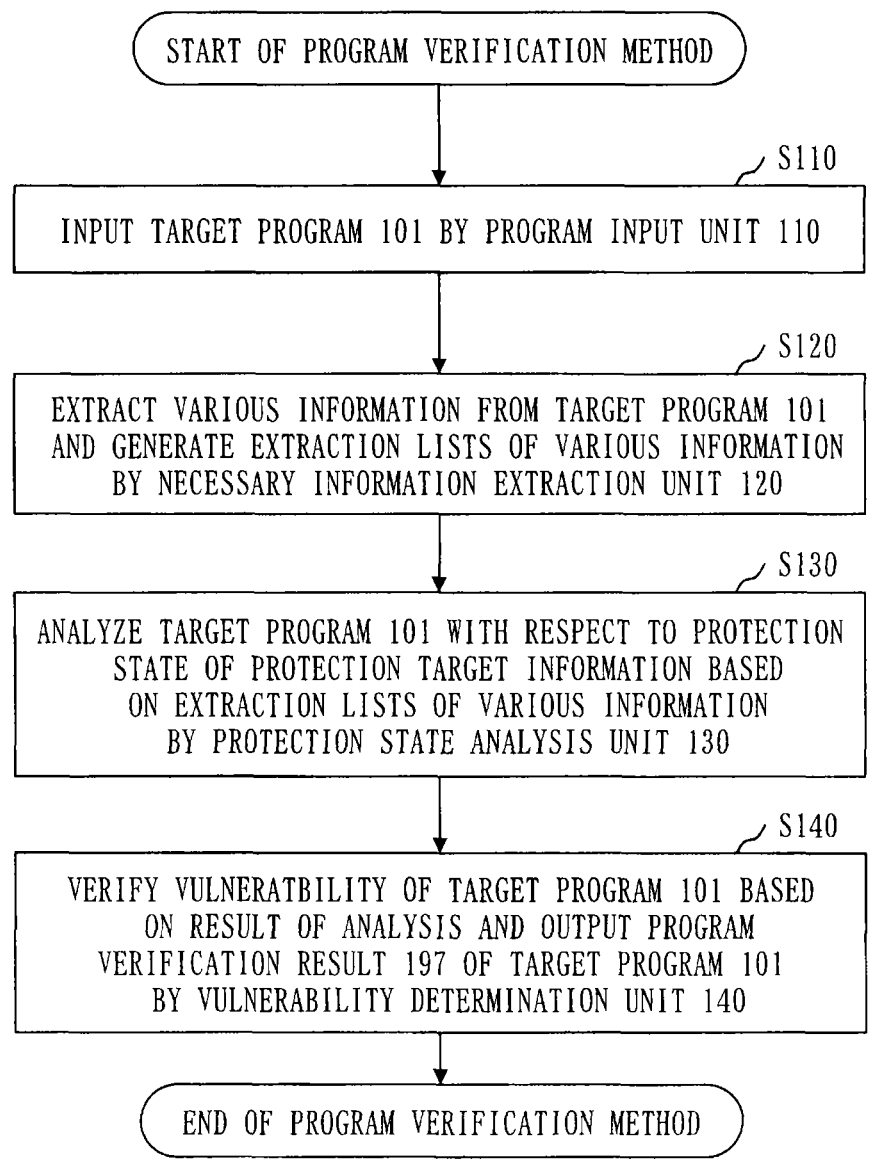
FIG. 5 is a flowchart illustrating a program verification method by the program verification apparatus 100 in the first embodiment.

FIG. 5 is a flowchart illustrating a program verification method by the program verification apparatus 100 in the first embodiment.

The program verification method by the program verification apparatus 100 in the first embodiment will be described, based on FIG. 5.

First, the program verification method by the program verification apparatus 100 will be outlined.

In step S110, the program input unit 110 inputs the target program 101.

In step S120, the necessary information extraction unit 120 extracts various information from the target program 101 and generates the extraction lists of the various information.

In step S130, the protection state analysis unit 130 analyzes the target program 101 with respect to a protection state of protection target information, based on the extraction lists of the various information.

In step S140, the vulnerability determination unit 140 determines a vulnerable element included in the target program 101, based on a result of analysis of the target program 101, generates the program verification result 197 indicating a result of determination, and outputs the generated program verification result 197.

Next, details of the respective processes from step S110 to step S140 will be described.

In step S110, a user specifies the program (target program 101) desired to be verified, for the program verification apparatus 100, using an input device such as a keyboard or a mouse.

The program input unit 110 of the program verification apparatus 100 inputs the specified target program 101.

The target program 101 is input in the form of a source code. When the target program 101 is a compiled bytecode, the program input unit 110 decompiles the target program 101 into the source code.

The target program 101 is stored in an auxiliary storage device in advance, and the program input unit 110 inputs the target program 101 from the auxiliary storage device, for example. Input is defined as storage in a predetermined storage region of a memory (verification apparatus storage unit 190), for example.

After step S110, the procedure proceeds to step S120.

Figure 6:
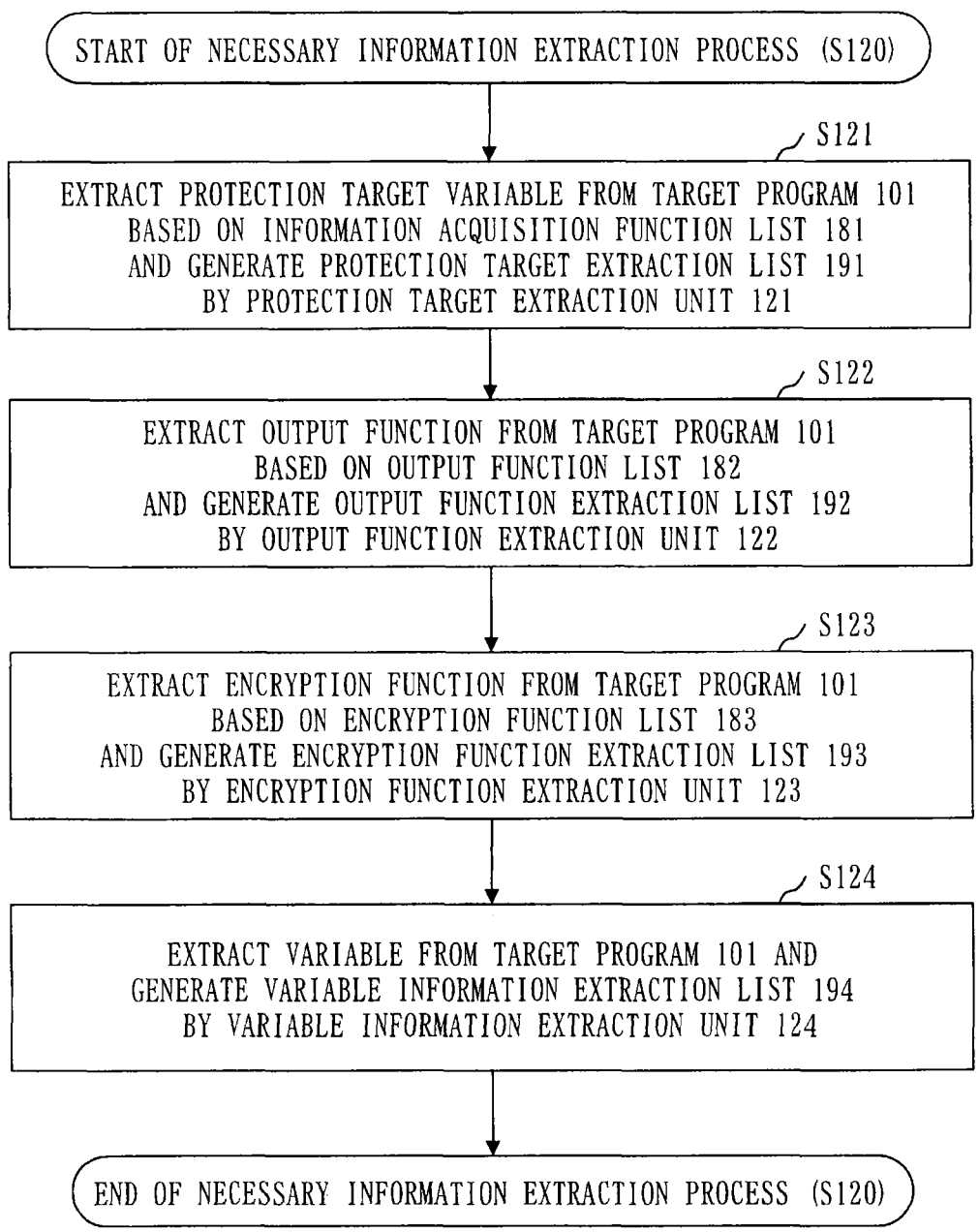
FIG. 6 is a flowchart illustrating a necessary information extraction process (in step S120) in the first embodiment.

FIG. 6 is a flowchart illustrating the necessary information extraction process (in step S120) in the first embodiment.

The necessary information extraction process (in step S120) in the first embodiment will be described, based on FIG. 6.

In the necessary information extraction process (in step S120), each component of the necessary information extraction unit 120 refers to the target program 101 input in step S101 from the leading line to the last line of the target program 101, and generates the various lists, as will be described below.

The necessary information extraction process (in step S120) is constituted from respective processes from step S121 to step S124.

In step S121, the protection target extraction unit 121 obtains the information acquisition function list 181 from the verification apparatus storage unit 190.

The protection target extraction unit 121 extracts, from the target program 101 input in step S110, a variable to which the protection target information is set, based on the obtained information acquisition function list 181. Hereinafter, the variable to which the protection target information is set will be referred to as a "protection target variable".

The protection target extraction unit 121 generates the protection target extraction list 191 listing the extracted protection target variable.

After step S121, the procedure proceeds to step S122.

FIG. 7 is a diagram illustrating an example of the target program 101 in the first embodiment.

FIG. 8 is a table illustrating an example of the information acquisition function list 181 in the first embodiment.

FIG. 9 is a table illustrating an example of the protection target extraction list 191 in the first embodiment.

An example of the protection target extraction process (in step S121) will be described, based on FIGS. 7 to 9.

An information acquisition function list 181A (see FIG. 8) is a list of information acquisition functions for obtaining the protection target information. The information acquisition function list 181A is generated in advance, and is stored in the verification apparatus storage unit 190.

The information acquisition function list 181A includes a "function name" and "protection target information", in association with each other.

The "function name" indicates the function name of each information acquisition function.

The "protection target information" indicates content of the protection target information to be obtained by the information acquisition function.

The information acquisition function list 181A in FIG. 8 indicates that an information acquisition function "getProfile" is a function for acquiring protection target information "profile", for example.

The protection target extraction unit 121 extracts from a target program 101A (see FIG. 7) a line in which the information acquisition function is used, based on the information acquisition function list 181A (see FIG. 8).

The information acquisition function "getProfile" is used in the first line of the target program 101A in FIG. 7, for example.

The protection target extraction unit 121 generates a protection target extraction list 191A (see FIG. 9), based on the line in which the information acquisition function is used and the information acquisition function list 181A.

The protection target extraction list 191A includes a "variable name", a "position (line number)", "protection target information", and an "information state", in association with one another.

The "variable name" indicates the variable name of each protection target variable to which the protection target information obtained by the information acquisition function is set.

The "position (line number)" indicates the number of a line in which the protection target information is set to the protection target variable.

The "protection target information" indicates content of the protection target information set to the protection target variable.

The "information state" indicates one of a state where the protection target information set to the protection target variable is encrypted (as an encrypted text) and a state where the protection target information set to the protection target variable is not encrypted (as a plaintext). The protection target extraction unit 121 sets the "plaintext" in each field of the "information state", as an initial value.

To take an example, the protection target extraction list 191A in FIG. 9 indicates that the protection target information "profile" is set to a protection target variable "profile" in the first line of the target program 101A (see FIG. 7).

Returning to FIG. 6, the description of the necessary information extraction process (in step S120) will be continued from step S122.

In step S122, the output function extraction unit 122 obtains the output function list 182 from the verification apparatus storage unit 190.

The output function extraction unit 122 extracts an output function from the target program 101 input in step S110, based on the obtained output function list 182.

The output function extraction unit 122 generates the output function extraction list 192 listing the extracted output function.

After step S122, the procedure proceeds to step S123.

FIG. 10 is a table illustrating an example of the output function list 182 in the first embodiment.

FIG. 11 is a table illustrating an example of the output function extraction list 192 in the first embodiment.

An example of the output function extraction process (in step S122) will be described, based on FIGS. 7, 10, and 11.

An output function list 182A (see FIG. 10) is a list of output functions for outputting the information. The output function list 182A is generated in advance, and is stored in the verification apparatus storage unit 190.

The output function list 182A includes a "function name", "output content", and an "output state", in association with one another.

The "function name" indicates the name of each output function.

The "output content" indicates content of the output function. A function for outputting a file, a function for communication, a function for communication between programs, and a function for writing to a database are, for example, examples of the output functions.

The "output state" indicates an "encrypted text" or a "plaintext". The "encrypted text" denotes that the output function outputs information encrypted by the output function, while the "plaintext" denotes that the output function outputs information without encrypting the information.

The output function list 182A in FIG. 10 indicates that an output function "output" outputs a file without encrypting the file, for example.

The output function extraction unit 122 extracts from the target program 101A (see FIG. 7) a line in which the output function is used, based on the output function list 182A (see FIG. 10).

The output function "output" is used in the ninth line of the target program 101A in FIG. 7, for example.

The output function extraction unit 122 generates an output function extraction list 192A (see FIG. 11), based on the line in which the output function is used and the output function list 182A.

The output function extraction list 192A includes a "function name", a "position (line number)", an "actual argument", and an "output state", in association with one another.

The "function name" indicates the function name of each output function used in the target program 101A.

The "position (line number)" indicates the number of a line in which the output function is used.

The "actual argument" indicates an argument of the output function, or indicates a variable for output information to be output by the output function. An argument is a type of a variable (the same applies hereinafter). Hereinafter, the variable for the output information to be output by the output function will be referred to as an "output variable".

The "output state" indicates a state of the output information (plaintext or encrypted text) to be output by the output function.

The output function extraction list 192A in FIG. 11 indicates, for example, that set values (output information) of output variables "name", "age", and "sex" are output in the state of the "plaintexts" by the output function "output" in the ninth line of the target program 101A (see FIG. 7).

Returning to FIG. 6, the description of the necessary information extraction process (in step S120) will be continued from step S123.

In step S123, the encryption function extraction unit 123 obtains the encryption function list 183 from the verification apparatus storage unit 190.

The encryption function extraction unit 123 extracts an encryption function from the target program 101 input in step S110, based on the obtained encryption function list 183.

The encryption function extraction unit 123 generates the encryption function extraction list 193 listing the extracted encryption function.

After step S123, the procedure proceeds to step S124.

FIG. 12 is a diagram illustrating an example of the target program 101 in the first embodiment.

FIG. 13 is a table illustrating an example of the encryption function list 183 in the first embodiment.

FIG. 14 is a table illustrating an example of the encryption function extraction list 193 in the first embodiment.

An example of the encryption function extraction process (in step S123) will be described, based on FIGS. 12 to 14.

An encryption function list 183B (see FIG. 13) is a list of encryption functions for encrypting or decrypting the information. Hereinafter, an encryption function for encrypting the information will be referred to as an "encrypting function", while an encryption function for decrypting the information will be referred to as a "decrypting function".

The encryption function list 183B is generated in advance, and is stored in the verification apparatus storage unit 190.

The encryption function list 183B includes a "function name", a "key position", and "processing content", in association with one another.

The "function name" indicates the function name of each encryption function. The "key position" indicates the argument name of one of arguments of the encryption function to which an encryption key or a decryption key is set. The "processing content" indicates which one of encrypting processing and decrypting processing processing by the encryption function is.

The encryption function list 183B in FIG. 13 indicates that an encrypting function "enc" performs the processing of "encryption", using information of a "second argument" as the encryption key, for example.

The encryption function extraction unit 123 extracts from the target program 101B (see FIG. 12) a line in which the encryption function is used, based on the encryption function list 183B (see FIG. 13).

The encrypting function "enc" is used in the ninth line of the target program 101B in FIG. 12, for example.

The encryption function extraction unit 123 generates an encryption function extraction list 193B (see FIG. 14), based on the line in which the encryption function is used and the encryption function list 183B.

The encryption function extraction list 193B includes a "function name", a "position (line number)", an "actual argument of function", an "actual argument for key", a "variable for output", and an "output state", in association with one another The "function name" indicates the function name of each encryption function.

The "position (line number)" indicates the number of a line in which the encryption function is used.

The "actual arguments of function" indicates arguments set to the encryption function.

The "actual argument for key" indicates one of the arguments set to the encryption function, to which the encryption key is set.

The "variable for output" indicates a variable to which information processed by the encryption function is set. Hereinafter, the variable to which the information processed by the encryption function is set will be referred to as an "encryption variable".

The "output state" indicates which one of an encrypted state and a decrypted state the information processed by the encryption function is.

The encryption function extraction list 193B in FIG. 14 indicates, for example, that the encrypting function "enc" encrypts information set to an argument "tel", using the encryption key set to an argument "key" in the ninth line of the target program 101B (see FIG. 12), and that the information encrypted by the encrypting function "enc" is set to an encryption variable "enc_tel".

Returning to FIG. 6, the description of the necessary information extraction process (in step S120) will be continued from step S124.

In step S124, the variable information extraction unit 124 extracts a variable from the target program 101 input in step S110, and generates the variable information extraction list 194 listing the extracted variable.

In this case, the variable information extraction unit 124 may use constant propagation known as a common code optimization technology of a compiler as a process for extracting the variable (see Non-Patent Literature 1).

The necessary information extraction process (in step S120) is finished by step S124.

FIG. 15 is a diagram illustrating an example of the target program 101 in the first embodiment.

FIG. 16 is a table illustrating an example of the variable information extraction list 194 in the first embodiment.

An example of the variable information extraction process (in step S124) will be described, based on FIGS. 15 and 16.

The variable information extraction unit 124 extracts, from a target program 101C in FIG. 15, six variables "profile", "name", "age", "key", "h_key", and "enc_tel" each used as the assignment destination (left side) of an assignment statement or an argument of function.

The variable information extraction unit 124 sets information on the extracted variables in a variable information extraction list 194C (see FIG. 16).

The variable information extraction list 194C includes a "variable name", a "position (line number), and "content of variable" in association with one another.

The "variable name" indicates each variable used in the target program 101C.

The "position (line number)" indicates the number of a line in which the variable is used.

The "content of variable" indicates whether a value set to the variable is "variable" or "invariable (constant)".

The variable, however, may be classified into a type other than the two types of "variable" and "invariable".

To take an example, an "input variable" that is an output value of an external input function or a "time variable" that is an output value of a time acquisition function may be added to the types of the variable.

When a function includes only a variable that is "invariable" as an argument, for example, the content of a variable to which an output value of the function is set is "invariable". When a function includes an "input variable" as an argument, the content of a variable to which an output value of the function is set is an "input variable". When a function includes, as an argument, a "time variable" rather than the "input variable", content of a variable to which an output value of the function is set is a "time variable". When a function includes, as an argument, a variable that is "variable" without including the "input variable" or the "time variable", content of a variable to which an output value of the function is set is "variable".

Contents of the variables used in the target program 101C in FIG. 15 are as follows, for example.

Contents of the variables "profile", "name", and "age" of the assignment destinations in the first to third lines to which output values of functions (such as getProfile 0) without argument are assigned are "variable".

Content of the variable "key" in the fourth line, to which a constant "12345" is set, is "invariable".

Content of the variable "h_key" in the fifth line, to which an output value of a function (hash) is set, is "invariable". The function (hash) includes, as an argument, only a variable that is invariable.

Content of the variable "enc_tel", to which an output value of the function (enc) is set, is "variable". The function (enc) includes, as an argument, the variable (name) that is variable.

The variable information extraction list 194C in FIG. 16 indicates, for example, that the variable "profile" which is variable is used in the first line of the target program 101C and that the variable "key" which is invariable is used in the fourth to sixth line of the target program 101C.

Respective processes of the necessary information extraction process (in step S120) from step S121 to S124 described with reference to FIG. 6 may be executed by interchanging the order of the steps or may be executed in parallel.

After the necessary information extraction process (in step S120), the procedure proceeds to a protection state analysis process (in step S130) (see FIG. 5).

Figure 17:
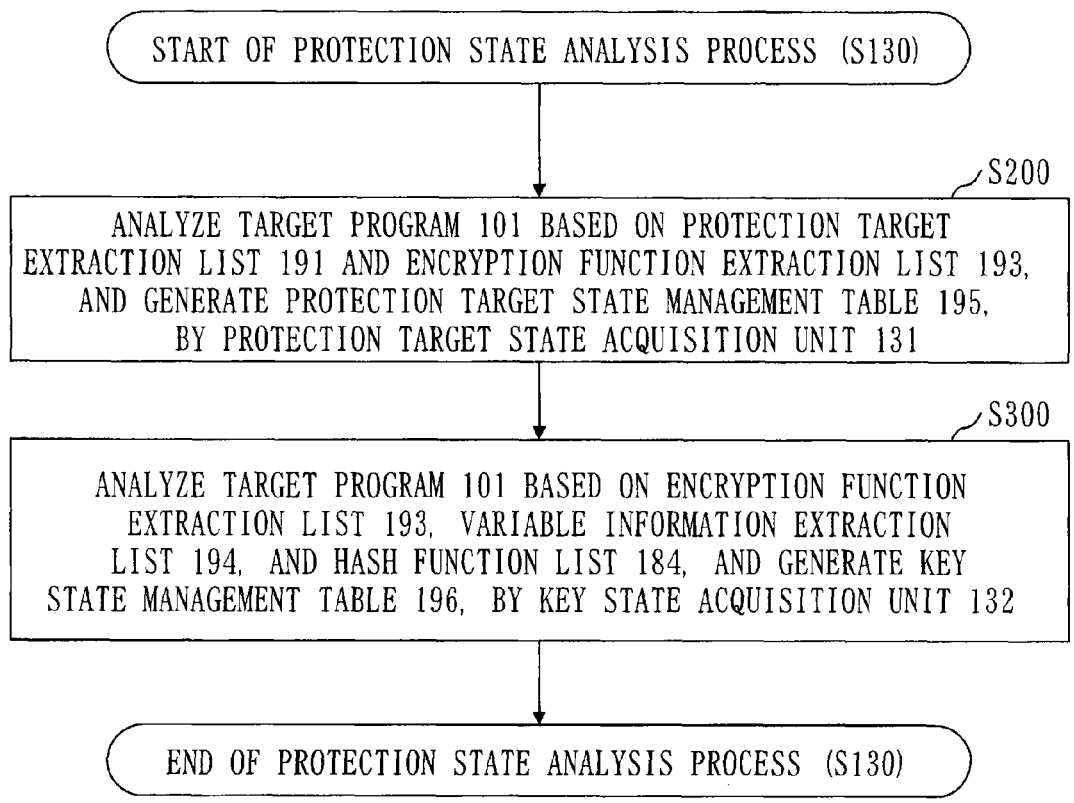
FIG. 17 is a flowchart illustrating a protection state analysis process (in step S130) in the first embodiment.

FIG. 17 is a flowchart illustrating the protection state analysis process (in step S130) in the first embodiment.

The protection state analysis process (in step S130) in the first embodiment will be described, based on FIG. 17.

The protection state analysis process (in step S130) is constituted from respective processes in steps S200 and S300.

In step S200, the protection target state acquisition unit 131 analyzes the target program 101, based on the protection target extraction list 191 generated in step S121 (see FIG. 6) and the encryption function extraction list 193 generated in step S123 (see FIG. 6).

Then, the protection target state acquisition unit 131 generates the protection target state management table 195, based on a result of analysis.

An example of a protection target state acquisition process (in step S200) will be described later.

After step S200, the procedure proceeds to step S300.

In step S300, the key state acquisition unit 132 analyzes the target program 101, based on the encryption function extraction list 193 generated in step S123 (see FIG. 6), the variable information extraction list 194 generated in step S124 (see FIG. 6), and the hash function list 184 stored in the verification apparatus storage unit 190 in advance.

Then, the key state acquisition unit 132 generates the key state management table 196, based on a result of analysis.

An example of a key state acquisition process (in step S300) will be described later.

By step S300, the protection state analysis process (in step S130) is finished.

Steps S200 and S300 of the protection state analysis process (in step S130) described with reference to FIG. 17 may be executed by interchanging the order of the steps S200 and S300, or may be executed in parallel.

Figure 18:
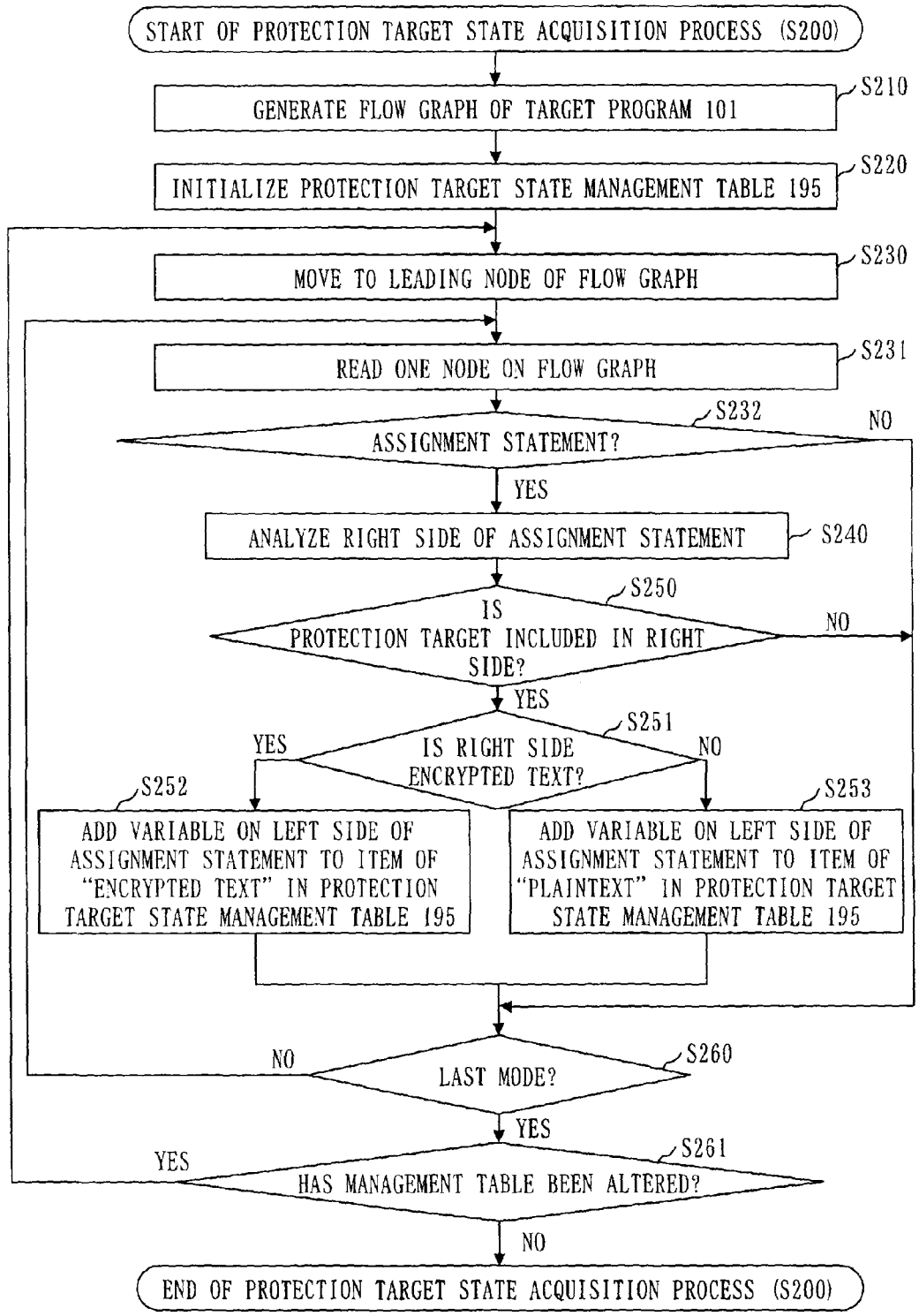
FIG. 18 is a flowchart illustrating an example of a protection target state acquisition process (in step S200) in the first embodiment.

FIG. 18 is a flowchart illustrating an example of the protection target state acquisition process (in step S200) in the first embodiment.

An example of the protection target state acquisition process (in step S200) in the first embodiment will be described, based on FIG. 18.

The protection target state acquisition process (in step S200) is constituted from respective processes from step S210 to step S261.

In step S210, the protection target state acquisition unit 131 generates a flow graph illustrating a processing flow of the target program 101.

A flow graph indicates data of a graph illustrating all processing paths (order of processings) of a program, using nodes each indicating one instruction (and a line number) within the program and edges that connect the nodes in the order of the processings.

The protection target state acquisition unit 131 generates the flow graph of the target program 101, using an existent tool, for example.

After step S210, the procedure proceeds to step S220.

In step S220, the protection target state acquisition unit 131 generates the protection target state management table 195, and initializes the protection target state management table 195, based on the protection target extraction list 191.

After step S220, the procedure proceeds to step S230.

FIG. 19 is a table illustrating an example of the protection target extraction list 191 in the first embodiment.

FIG. 20 is a table illustrating an example of initialization of the protection target state management table 195 in the first embodiment.

An example of a management table initialization process (in step S220) will be described, based on FIGS. 19 and 20.

A protection target state management table 195D (see FIG. 20) includes a "line number", a "plaintext", and an "encrypted text", in association with one another.

The "line number" indicates a line number of the target program 101.

The "plaintext" indicates each protection target variable that is not encrypted. Hereinafter, the protection target variable that is not encrypted will be referred to as a "plaintext state variable".

The "encrypted text" indicates each protection target variable that is encrypted. Hereinafter, the protection target variable that is encrypted will be referred to as an "encrypted state variable".

A protection target extraction list 191D in FIG. 19 indicates that the protection target variable "profile" in the state of the "plaintext" is set in the first line of the target program 101, and that a protection target variable "name" in the state of the "plaintext" is set in the second line of the target program 101.

Then, as illustrated in FIG. 20, the protection target state acquisition unit 131 sets the protection target variable "profile" in the field of the "plaintext" associated with the line number of the "first line" in the protection target state management table 195D.

Further, the protection target state acquisition unit 131 sets the protection target variable "name" in the field of the "plaintext" associated with the line number of the "second line" in the protection target state management table 195D.

That is, based on the protection target extraction list 191D, the protection target state acquisition unit 131 sets the variable name of a protection target variable in the protection target state management table 195D, in association with the number of the line in which the protection target variable is set and the state of the protection target variable.

The protection target state management table 195D illustrated in FIG. 20 is in a state that has been initialized, based on the protection target extraction list 191D illustrated in FIG. 19.

Returning to FIG. 18, the description of the protection target state acquisition process (in step S200) will be continued from step S230.

In step S230, the protection target state acquisition unit 131 specifies a leading node on the flow graph generated in step S210, by a processing pointer. Herein, the processing pointer specifies the node to be processed.

After step S230, the procedure proceeds to step S231.

In step S231, the protection target state acquisition unit 131 reads into the memory the node specified by the processing pointer from the flow graph generated in step S210.

Hereinafter, the node read in step S231 will be referred to as an "attention node", and an instruction indicated by the node read in S231 will be referred to as an "attention node instruction".

Further, the protection target state acquisition unit 131 specifies the node immediately preceding the attention node, based on the flow graph, and obtains, from the protection target state management table 195, a plaintext state variable and an encrypted state valuable associated with the same line number as that of the specified node.

Then, the protection target state acquisition unit 131 confirms that the obtained plaintext state variable and the obtained encrypted state variable are not overwritten by the attention node instruction. If an attention node instruction is an assignment statement and the left side of the assignment statement is a plaintext state variable or an encrypted state variable, the plaintext state variable or the encrypted state variable is overwritten.

When the obtained plaintext state variable and the obtained encrypted state variable are determined not to be overwritten, the protection target state acquisition unit 131 adds the obtained plaintext state variable and the obtained encrypted state variable to the protection target state management table 195, in association with the same line number as that of the attention node.

When the protection target state management table 195D is in the state illustrated in FIG. 20, for example, the protection target state acquisition unit 131 adds the plaintext "profile" in the "first line" of the line number immediately preceding an attention node to the plaintext in the "second line" of the line number of the attention node. With this arrangement, the protection target state management table 195D becomes a state illustrated in FIG. 21.

FIG. 21 is a table illustrating an example of the protection target state management table 195 in the first embodiment.

After step S231, the procedure proceeds to step S232.

In step S232, the protection target state acquisition unit 131 determines whether or not the attention node instruction indicated by the attention node read in step S231 is an assignment statement.

If the attention node instruction is determined to be the assignment statement (YES), the procedure proceeds to step S240.

If the attention node instruction is determined not to be the assignment statement (NO), the procedure proceeds to step S260.

In step S240, the protection target state acquisition unit 131 analyzes the right side (assignment source) of the attention node instruction (assignment statement) like the following (1) or (2):

(1) The protection target state acquisition unit 131 analyzes whether or not a protection target variable set in the protection target state management table 195 is included in the right side of the attention node instruction.

(2) The protection target state acquisition unit 131 analyzes which one of an encrypting function set in the encryption function extraction list 193 and an encrypted state variable set in the protection target state management table 195 the right side of the attention node instruction is, by referring to the encryption function extraction list 193.

After step S240, the procedure proceeds to step S250.

In step S250, the protection target state acquisition unit 131 determines whether or not the protection target variable is included in the right side (assignment source) of the attention node instruction (assignment statement), based on a result of analysis in step S240.

If the protection target variable is determined to be included in the right side of the attention node instruction (YES), the procedure proceeds to step S251.

If the protection target variable is determined not to be included in the right side of the attention node instruction (NO), the procedure proceeds to step S260.

In step S251, the protection target state acquisition unit 131 determines which one of the encrypting function or the encrypted state variable the right side (assignment source) of the attention node instruction (assignment statement) is, based on the result of analysis in step S240.

If the right side of the attention node instruction is determined to be one of the encrypting function and the encrypted state variable (YES), the procedure proceeds to step S252.

If the right side of the attention node instruction is determined to be neither the encrypting function nor the encrypted state variable (NO), the procedure proceeds to step S253.

In step S252, the protection target state acquisition unit 131 adds a variable name on the left side (assignment destination) of the attention node instruction (assignment statement) to the item of "encrypted text" in the protection target state management table 195, in association with the line number of the attention node. The variable added to the item of "encrypted text" in the protection target state management table 195 is an example of the encrypted state variable.

If the right side of the attention node instruction is the encrypting function, the protection target state acquisition unit 131 sets the function name of the encrypting function and the number of a line in which the encrypting function is used, in association with the added encrypted state variable.

Further, the protection target state acquisition unit 131 obtains, from the encryption function extraction list 193, the name of a key variable of the encrypting function, and then adds the obtained key variable name to the item of "plaintext" in the protection target state management table 195, in association with the line number of the attention node. The key variable added to the item of "plaintext" in the protection target state management table 195 is an example of the plaintext state variable.

To take an example, the right side of the seventh line (assignment statement) of a target program 101D illustrated in FIG. 22 is an encrypting function "enc (name1, key)", and the key variable is "key".

When the line number of an attention node is the seventh line, the protection target state acquisition unit 131 adds a variable name "enc_name" on the left side in the seventh line of the target program 101D to the item of "encrypted text" in the protection target state management table 195D, in association with the "seventh line" of the line number of the attention node.

The protection target state acquisition unit 131 sets an encrypting function name "enc" and the line number of the "seventh line" in the protection target state management table 195D, in association with the added variable name "enc_name".

Further, the protection target state acquisition unit 131 adds a key variable name "key" to the item of "plaintext" of the protection target state management table 195D, in association with the line number of the "seventh line" of the attention node.

With this arrangement, the protection target state management table 195D becomes a state illustrated in FIG. 23.

FIG. 22 is an example of the target program 101 in the first embodiment.

FIG. 23 is an example of the protection target state management table 195 in the first embodiment.

After step S252, the procedure proceeds to step S260.

In step S253, the protection target state management unit 131 adds the variable name on the left side (assignment destination) of the attention node instruction (assignment statement) to the item of "plaintext" of the protection target state management table 195, in association with the line number of the attention node. The variable added to the item of "plaintext" of the protection target state management table 195 is an example of the plaintext state variable.

When the right side of the attention node instruction is a decrypting function, the protection target state acquisition unit 131 sets the function name of the decrypting function and the number of a line in which the decrypting function is used, in association with the plaintext state variable to be added.

To take an example, the right side of the third line (assignment statement) of the target program 101D illustrated in FIG. 22 is the protection target variable "name" that is not encrypted.

When the line number of an attention node is the third line, the protection target state acquisition unit 131 adds a variable name "name 1" on the left side in the third line of the target program 101 to the item of the "plaintext" of the protection target state management table 195D, in association with the "third line" of the line number of the attention node.

With this arrangement, the protection target state management table 195D becomes a state in FIG. 24.

FIG. 24 is a table illustrating an example of the protection target state management table 195 in the first embodiment.

After step S253, the procedure proceeds to step S260.

In step S260, the protection target state acquisition unit 131 determines whether or not the attention node specified by the processing pointer is the node listed last on the flow graph.

If the attention node is determined to be the last node (YES), the procedure proceeds to step S261.

If the attention node is determined not to be the last node (NO), the protection target state acquisition unit 131 specifies the node subsequent to the attention node as a new attention node, by the processing pointer. Then, the procedure returns to step S231.

In step S261, the protection target state acquisition unit 131 determines whether or not the protection target state management table 195 has been altered. In other words, the protection target state acquisition unit 131 determines whether or not step S252 or step S253 has been executed in a loop from step S231 to step S260. If step S252 or step S253 has been executed, the protection target state management table 195 is altered.

To take an example, the protection target state acquisition unit 131 sets, in an alteration flag, the value of the alteration flag indicating that the protection target state management table 195 has been altered when the protection target state acquisition unit 131 has executed step S252 or step S253. Then, the protection target state acquisition unit 131 determines whether or not the alteration flag value is set in the alteration flag. After the determination, the protection target state acquisition unit 131 initializes the alteration flag using an unchanging alteration value indicating that the protection target state management table 195 is not altered.

The protection target state acquisition unit 131, however, may copy the protection target state management table 195 in step S230, and may determine whether or not the protection target state management table 195 has been altered by comparing the protection target state management table 195 copied and the protection target state management table 195 at a current time.

No alteration in the protection target state management table 195 means that the processes have been finished for all the nodes on the flow graph, or means that the processes have been finished for all the processing paths on the flow graph, for example.

Then, the protection target state acquisition unit 131 may determine whether or not the processes have been finished for all the nodes on the flow graph, or may determine whether or not the processes have been finished for all the processing paths on the flow graph, instead of determining whether or not the protection target state management table 195 has been altered.

If the protection target state management table 195 is determined to have been altered (YES), the procedure returns to step S230, and the processes are repeated from step S230.

If the protection target state management table 195 is determined not to have been altered (NO), the protection target state acquisition process (in step S200) is finished.

FIG. 25 is a table illustrating an example of the encryption function extraction list 193 in the first embodiment.

FIG. 26 is a table illustrating an example of the protection target state management table 195 in the first embodiment.

The protection target state acquisition unit 131 generates the protection target state management table 195D illustrated in FIG. 26, based on the target program 101D illustrated in FIG. 22, the protection target extraction list 191D illustrated in FIG. 19, and an encryption function extraction list 193D illustrated in FIG. 25, by the protection target state acquisition process (in step S200) (see FIG. 18).

FIG. 27 is a diagram illustrating an example of the target program 101 in the first embodiment.

FIG. 28 is a table illustrating an example of the protection target extraction list 191 in the first embodiment.

FIG. 29 is a table illustrating an example of the encryption function extraction list 193 in the first embodiment.

FIG. 30 is a table illustrating an example of the protection target state management table 195 in the first embodiment.

The protection target state acquisition unit 131 generates a protection target state management table 195E illustrated in FIG. 30, based on a target program 101E illustrated in FIG. 27, a protection target extraction list 191E illustrated in FIG. 28, and an encryption function extraction list 193E illustrated in FIG. 29, by the protection target state acquisition process (in step S200) (see FIG. 18).

Figure 31:
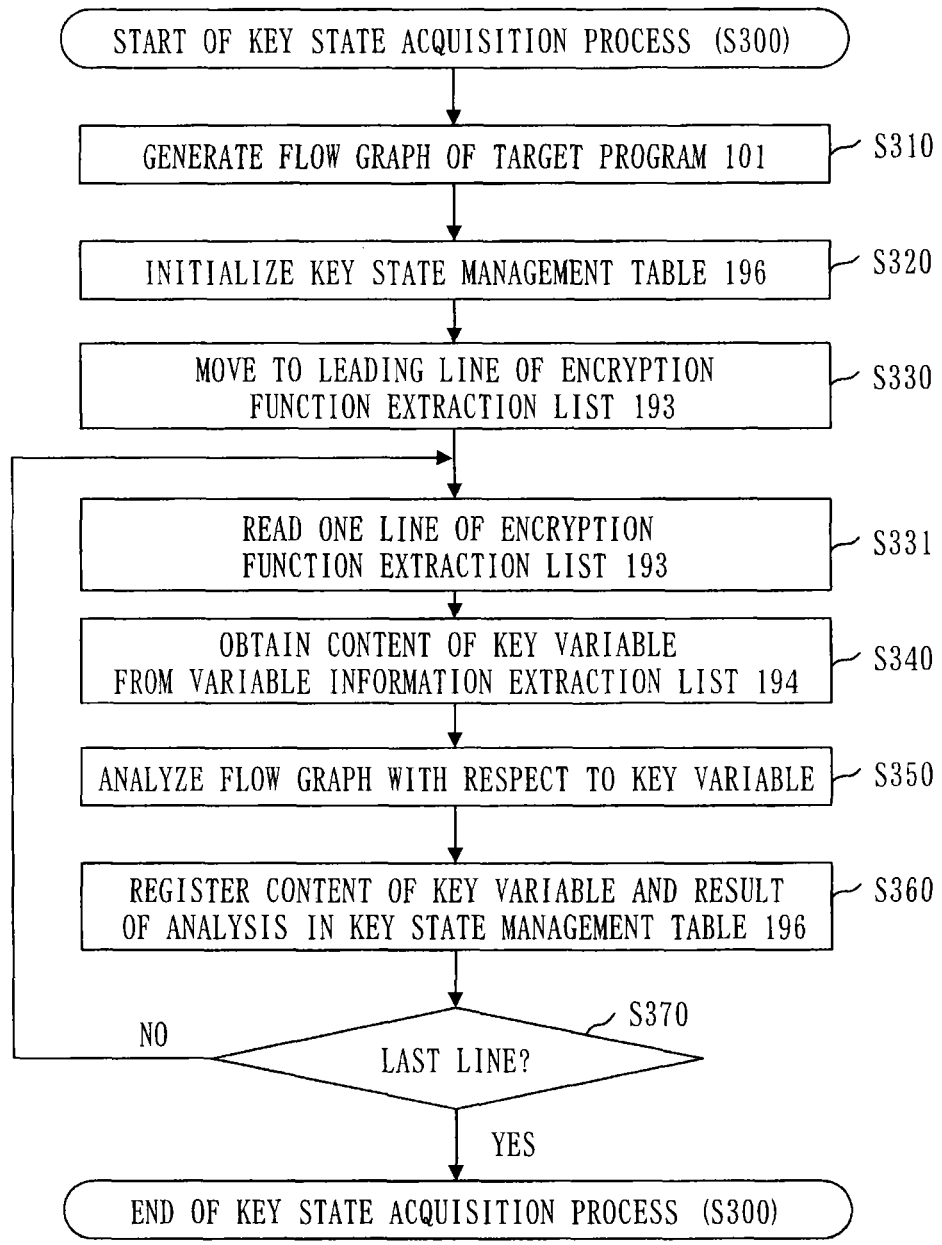
FIG. 31 is a flowchart illustrating an example of a key state acquisition process (in step S300) in the first embodiment.

FIG. 31 is a flowchart illustrating an example of the key state acquisition process (in step S300) in the first embodiment.

The example of the key state acquisition process (in step S300) in the first embodiment will be described, based on FIG. 31.

The key state acquisition process (in step S300) is constituted from respective processes from step S310 to step S370.

In step S310, the key state acquisition unit 132 generates a flow graph of the target program 101. It may be so arranged, however, that the key state acquisition unit 132 does not generate the flow graph of the target program 101, and uses the flow graph (refer to step S210 in FIG. 18) generated by the protection target state acquisition unit 131.

After step S310, the procedure proceeds to step S320.

In step S320, the key state acquisition unit 132 generates and initializes the key state management table 196.

After step S320, the procedure proceeds to step S330.

FIG. 32 is a table illustrating a configuration of the key state management table 196 in the first embodiment.

The configuration of the key state management table 196 in the first embodiment will be described, based on FIG. 32.

The key state management table 196 includes a "position (line number)", a "key variable", an "operator (function name)", and "content", in association with one another.

The "position (line number)" indicates the number of a line in which each encrypting function is used.

The "key variable" indicates a key variable used as the encryption key.

The "operator (function name)" indicates an operator and a function used for generating the key variable.

The "content" indicates whether a value set to the key variable is "variable" or "invariable".

The key state management table 196 that has been initialized is in a state where no information is set (see FIG. 32).

Returning to FIG. 31, the description about the key state acquisition process (in step S200) will be continued from step S330.

In step S330, the key state acquisition unit 132 specifies the leading line of the encryption function extraction list 193 by a processing pointer. Herein, the processing pointer specifies a line of the encryption function extraction list 193.

After step S330, the procedure proceeds to step S331.

In step S331, the key state acquisition unit 132 reads into the memory the line specified by the processing pointer from the encryption function extraction list 193. Hereinafter, the line read in step S331 will be referred to as an "attention line".

After step S331, the procedure proceeds to step S340.

In step S340, the key state acquisition unit 132 obtains the variable name of a key variable from the attention line of the encryption function extraction list 193, and obtains from the variable information extraction list 194 the (variable or invariable) content of the key variable identified by the obtained variable name.

To take an example, when No "1" in an encryption function extraction list 193F illustrated in FIG. 33 is the attention line, the key state acquisition unit 132 obtains, from a variable information extraction list 194F illustrated in FIG. 34, content of "variable" associated with the same variable name as an actual argument for key "key2" (key variable).

FIG. 33 is a table illustrating an example of the encryption function extraction list 193 in the first embodiment.

FIG. 34 is a table illustrating an example of the variable information extraction list 194 in the first embodiment.

After step S340, the procedure proceeds to step S350.

In step S350, the key state acquisition unit 132 analyzes the flow graph with respect to the key variable in the attention line, and obtains an operator and a function used for generating the key variable in the attention line, as a result of analysis.

Details of a key variable analysis process (in step S350) will be described later.

After step S350, the procedure proceeds to step S360.

In step S360, the key state acquisition unit 132 registers, in the key state management table 196, the line number of the attention line set in the encryption function extraction list 193, the content of the key variable obtained in step S340, and the result of analysis (the operator and the function) obtained in step S350.

After step S360, the procedure proceeds to step S370.

In step S370, the key state acquisition unit 132 determines whether or not the attention line at a current time is the last line of the encryption function extraction list 193.

If the current attention line is determined to be the last line of the encryption function extraction list 193 (YES), the key state acquisition process (in step S300) is finished.

If the current attention line is determined not to be the last line of the encryption function extraction list 193 (NO), the key state acquisition unit 132 specifies the line subsequent to the current attention line, as a new attention line, by the processing pointer. Then, the procedure returns to step S331.

FIG. 35 is a diagram illustrating an example of the target program 101 in the first embodiment.

FIG. 36 is a table illustrating an example of the key state management table 196 in the first embodiment.

The key variable "key2" of an encrypting variable "enc" in a target program 101F illustrated in FIG. 35 is generated using an operator "xor" (in the sixth line), a hash function "hash"(in the fifth line)", and an operator "+" (in the fifth line).

The key state acquisition unit 132 generates a key state management table 196F illustrated in FIG. 36 by the key state acquisition process (in step S300) (see FIG. 31), based on the target program 101F illustrated in FIG. 35, the encryption function extraction list 193F illustrated in FIG. 33, and the variable information extraction list 194F illustrated in FIG. 34.

Herein, the hash function list 184 is assumed to include a function name "hash" for the hash function.

Figure 37:
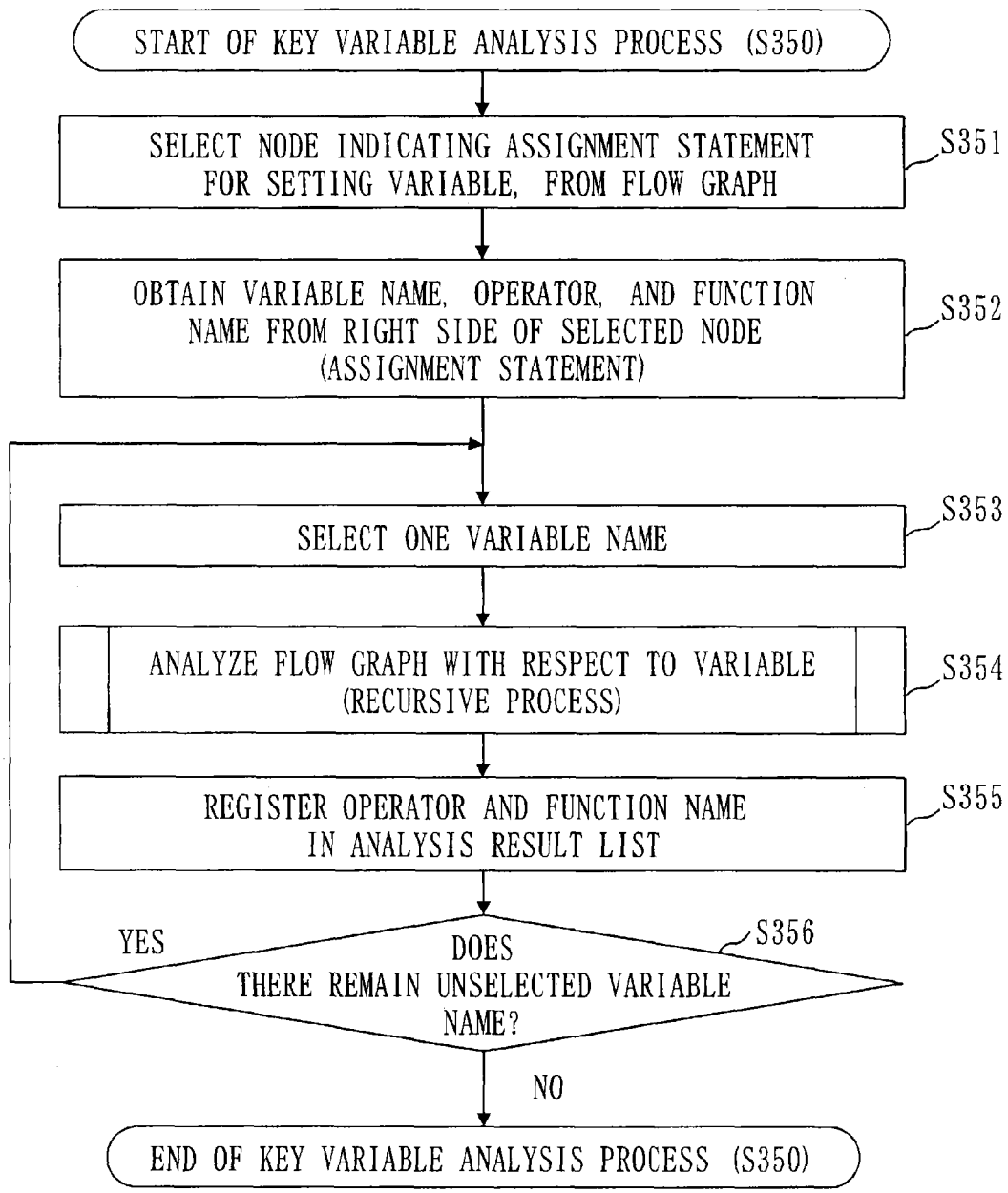
FIG. 37 is a flowchart illustrating a key variable analysis process (in step S350) in the first embodiment.

FIG. 37 is a flowchart illustrating the key variable analysis process (in step S350) in the first embodiment.

The key variable analysis process (in step S350) in the key state acquisition process (in step S300) (see FIG. 31) will be described, based on FIG. 37.

The key variable analysis process (in step S350) is constituted from respective processes in steps S351 to S356.

In step S351, the key state acquisition unit 132 obtains, from the variable information extraction list 194, the line number of each line in which the key variable in the attention line of the encryption function extraction list 193 is used, and selects, from the flow graph, one of the nodes that indicates an assignment statement for setting the key variable in the attention line. The nodes each represent the line to be identified by the obtained line number. The selected node will be referred to as an "attention node".

To take an example, when the key variable in the attention line is "key2", the key state acquisition unit 132 obtains, from the variable information extraction list 194F illustrated in FIG. 34, the line numbers of "6" and "7" associated with the key variable "key2". Then, the key state acquisition unit 132 selects, from the line numbers of "6" and "7", the line number of "6" of the assignment statement for setting the key variable "key2" (see the sixth line in FIG. 35). In this case, the node indicating the assignment statement in the sixth line is the attention node.

After step S351, the procedure proceeds to step S352.

In step S352, the key state acquisition unit 132 obtains, from the right side (assignment source) of the attention node (assignment statement) selected in step S351, one or more variable names, an operator, and a function name (such as the hash function name included in the hash function list 184).

To take an example, the key state acquisition unit 132 obtains, from the assignment statement (attention node) in the sixth line of the target program 101F illustrated in FIG. 35, variable names "key1", "seed2" and the operator "xor" used on the right side.

After step S352, the procedure proceeds to step S353.

In step S353, the key state acquisition unit 132 selects one unselected variable name from among the one or more variable names obtained in step S352.

After step S353, the procedure proceeds to step S354.

In step S354, the key state acquisition unit 132 analyzes the flow graph with respect to the variable to be identified by the variable name selected in step S353, as in the case of the key variable in the attention line.

In other words, the key state acquisition unit 132 executes the key variable analysis process (in step S350) by replacing the name of the key variable in the attention line with the variable name selected in step S353.

It means that the key state acquisition unit 132 recursively executes the key variable analysis process (in step S350) with respect to the variable for setting the key variable.

To take an example, the key state acquisition unit 132 executes the key variable analysis process (in step S350) with respect to a variable "key1" used in the assignment statement (in the sixth line) for setting the key variable "key2" in the target program 101F illustrated in FIG. 35.

Further, the key state acquisition unit 132 executes the key variable analysis process (in step S350) with respect to a variable "in" used in an assignment statement (in the fifth line) for setting the variable "key1".

The key state acquisition unit 132 also executes the key variable analysis process (in step S350) with respect to other variables "seed2" and "seed1" for setting the key variable "key2".

After step S354, the procedure proceeds to step S355.

In step S355, the key state acquisition unit 132 registers the operator and the function name obtained in step S352 (including an operator and a function name recursively obtained in step S354) in an analysis result list. The analysis result list indicates a result of analysis of the key variable analysis process (S350).

To take an example, the key state acquisition unit 132 registers in the analysis result list the operator "xor" in the assignment statement (in the sixth line) for setting the key variable "key2", the hash function name "hash" and the operator "+" in the assignment statement (in the fifth line) for setting the variable "key1" from among the operators and the function names included in the target program 101F illustrated in FIG. 35.

After step S355, the procedure proceeds to step S356.

In step S356, the key state acquisition unit 132 determines whether or not there remains the variable name that has not been selected in step S353.

If it is determined that there remains the unselected variable name (YES), the procedure returns to step S353.

If it is determined that there does not remain the unselected variable name (NO), the key variable analysis process (in step S350) is finished.

Figure 38:
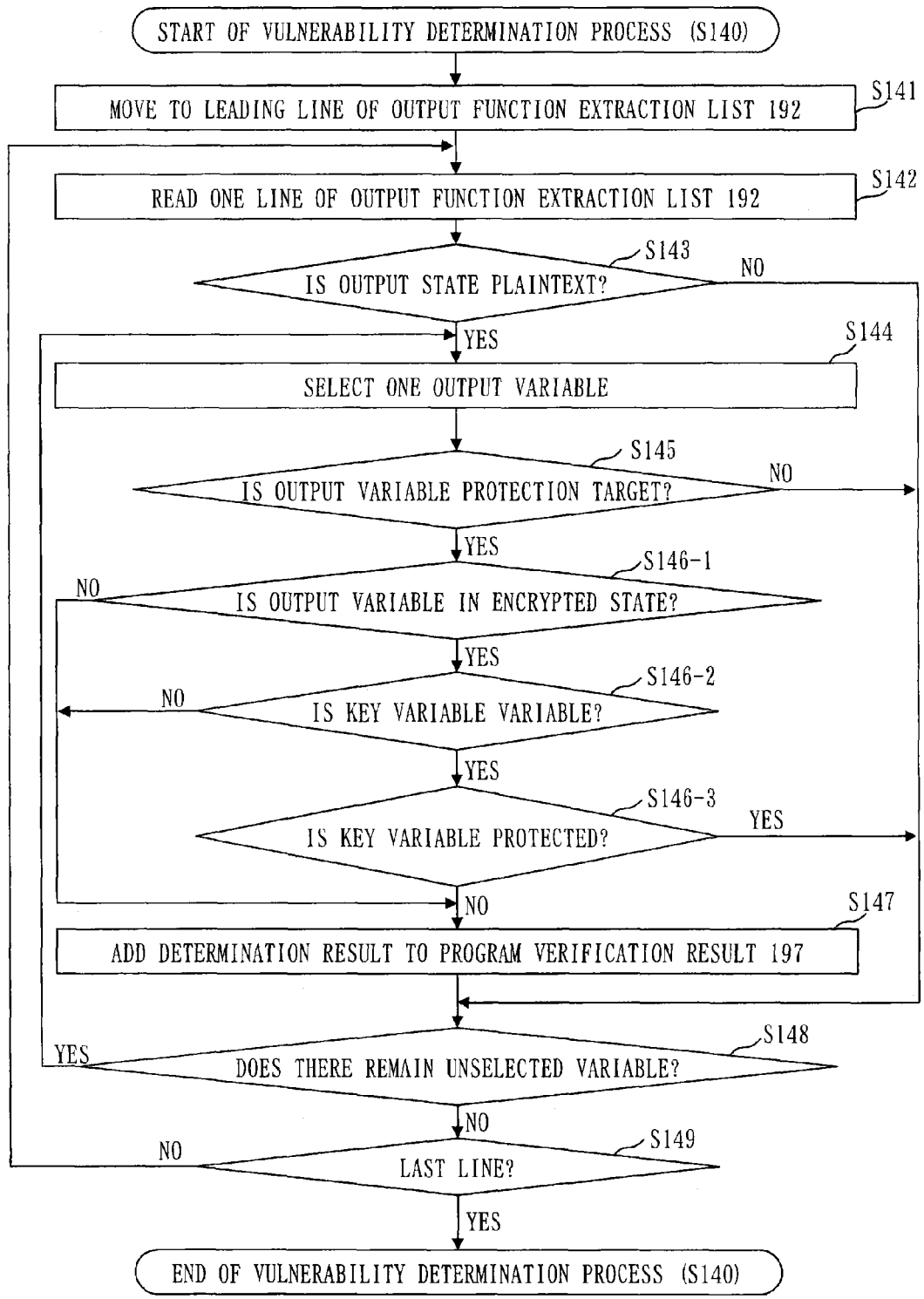
FIG. 38 is a flowchart illustrating an example of a vulnerability determination process (in step S140) in the first embodiment.

FIG. 38 is a flowchart illustrating an example of a vulnerability determination process (in step S140) in the first embodiment.

The vulnerability determination process (in step S140) (see FIG. 5) in the first embodiment will be described, based on FIG. 38.

The vulnerability determination process (in step S140) is constituted from respective processes from step S141 to step S149.

In step S141, the vulnerability determination unit 140 specifies the leading line of the output function extraction list 192 generated in step S122 (see FIG. 6) by a processing pointer. Herein, the processing pointer specifies a line of the output function extraction list 192.

After step S141, the procedure proceeds to step S142.

In step S142, the vulnerability determination unit 140 reads the line specified by the processing pointer from the output function extraction list 192 into the memory. Hereinafter, the line read in step S142 will be referred to as an "attention line".

After step S142, the procedure proceeds to step S143.

In step S143, the vulnerability determination unit 140 refers to the attention line in the output function extraction list 192, and determines whether or not an item of "output state" with respect to the attention line is a "plaintext".

To take an example, when No "1" in an output function extraction list 192D illustrated in FIG. 39 is the attention line, the item of "output state" with respect to the attention line is the "plaintext".

FIG. 39 is a table illustrating an example of the output function extraction list 192 in the first embodiment.

If the item of "output state" with respect to the attention line is the "plaintext" (YES), the procedure proceeds to step S144.

If the item of "output state" with respect to the attention line is not the "plaintext", or if the item of "output state" with respect to the attention line is an "encrypted text" (NO), the procedure proceeds to step S148.

In step S144, the vulnerability determination unit 140 selects one output variable (actual argument of the output function) from the attention line in the output function extraction list 192.

To take an example, when No "1" in the output function extraction list 192D illustrated in FIG. 39 is the attention line, the output variable (actual argument) in the attention line is "enc_name".

After step S144, the procedure proceeds to step S145.

In step S145, the vulnerability determination unit 140 determines whether or not the output variable selected in step S144 is the same variable as a protection target variable included in the protection target state management table 195 generated in step S200 (see FIG. 17).

To take an example, the output variable "enc_name" is the protection target variable included in the protection target state management table 195D illustrated in FIG. 26.

If the output variable is determined to be the protection target variable (YES), the procedure proceeds to step S146-1.

If the output variable is determined not to be the protection target variable (NO), the procedure proceeds to step S148.

In step S146-1, the vulnerability determination unit 140 determines whether or not the output variable (protection target variable) selected in step S144 is an encrypted state variable included in the item of "encrypted text" in the protection target state management table 195.

To take an example, the output variable "enc_name" is the encrypted state variable included in the item of "encrypted text" in the protection target state management table 195D illustrated in FIG. 26.

If the output variable is determined to be the encrypted state variable (YES), the procedure proceeds to step S146-2.

If the output variable is determined not to be the encrypted state variable, or if the output variable is determined to be a plaintext state variable (NO), the procedure proceeds to step S147.

In step S146-2, the vulnerability determination unit 140 obtains, from the protection target state management table 195, the line number of an encrypting function set in association with the output variable (encrypted state variable).

The vulnerability determination unit 140 obtains, from the key state management table 196 generated in step S300 (see FIG. 17), the (variable or invariable) content of a key variable associated with the line number of the obtained encrypting function.

Then, the vulnerability determination unit 140 determines whether or not the content of the obtained key variable is variable.

To take an example, the vulnerability determination unit 140 obtains, from the protection target state management table 195D illustrated in FIG. 26, the line number of the "seventh line" of the encrypting function "enc" associated with the output variable "enc_name".

The vulnerability determination unit 140 obtains, from a key state management table 196D illustrated in FIG. 40, the content of "invariable" of the key variable "key" associated with the obtained line number of the "seventh line".

FIG. 40 is a table illustrating an example of the key state management table 196 in the first embodiment.

If the content of the key variable is determined to be variable (YES)", the procedure proceeds to step S146-3.

If the content of the key variable is determined not to be variable, or if the content of the key variable is determined to be invariable (NO), the procedure proceeds to step S147.

In step S146-3, the vulnerability determination unit 140 refers to the key state management table 196 to determine whether or not the encryption key set to the key variable has a secret value to be generated by a predetermined secret operation using a hash function, the operator "xor", or the like. The predetermined secret operation is an operation for calculating the secret value that is not inferred by a third party and is made secret to the third party.

To take an example, the key state management table 196F illustrated in FIG. 36 shows that the key variable "key2 " is generated by the operator "xor" and the hash function "hash". In this case, the vulnerability determination unit 140 determines that the key variable "key2 " is protected.

If the key variable is determined to be protected (YES), the procedure proceeds to step S148.

If the key variable is determined not to be protected (NO), the procedure proceeds to step S147.

In step S147, the vulnerability determination unit 140 adds a result of determination to the program verification result 197.

To take an example, the vulnerability determination unit 140 adds the following result of determination to the program verification result 197.

If the output variable is determined not to be the encrypted state variable (NO) in step S146-1, the vulnerability determination unit 140 adds to the program verification result 197 information on the output variable (such as the variable name and the line number) and information indicating that the output variable is in the state of a plaintext (in which the protection target information is output without being encrypted).

If the key variable is determined not to be variable (NO) in step S146-2, the vulnerability determination unit 140 adds to the program verification result 197 information on the key variable (such as the function name, the variable name, and the line number) and information indicating that the key variable is invariable (constant) (the protection target information is output without being appropriately encrypted).

If the key variable is determined not to be protected (NO) in step S146-3, the vulnerability determination unit 140 adds to the program verification result 197 the information on the key variable (such as the function name, the variable name, and the line number) and information indicating that the key variable is not protected (the protection target information is output without being appropriately encrypted).

After step S147, the procedure proceeds to step S148.

In step S148, the vulnerability determination unit 140 determines whether or not there remains an output variable that has not been selected in step S144.

If it is determined that there remains the unselected output variable (YES), the procedure returns to step S144.

If it is determined that there does not remain the unselected output variable (NO), the procedure proceeds to step S149.

In step S149, the vulnerability determination unit 140 determines whether or not the attention line at a current time is the last line of the output function extraction list 192.

If the current attention line is determined to be the last line of the output function extraction list 192 (YES), the vulnerability determination unit 140 outputs the program verification result 197 to an output apparatus such as a display or a printer. Then, the vulnerability determination process (in step S140) is finished.

If the current attention line is determined not to be the last line of the output function extraction list 192 (NO), the vulnerability determination unit 140 specifies the line subsequent to the current attention line as a new attention line, by the processing pointer. Then, the procedure returns to step S142.

In the vulnerability determination process (in step S140) described with reference to FIG. 38, the result of determination when the condition in each of steps S146-1 to S146-3 is not satisfied is set in the program verification result 197.

However, the result of determination in step S145 and at least one of the respective results of determinations in steps S146-1 to S146-3 may be set to the program verification result 197, for each of all the output variables.

Further, at least one of the results of determinations in steps S146-1 to S146-3 may be set in the program verification result 197, for each protection target variable of all the output variables.

Figure 41:
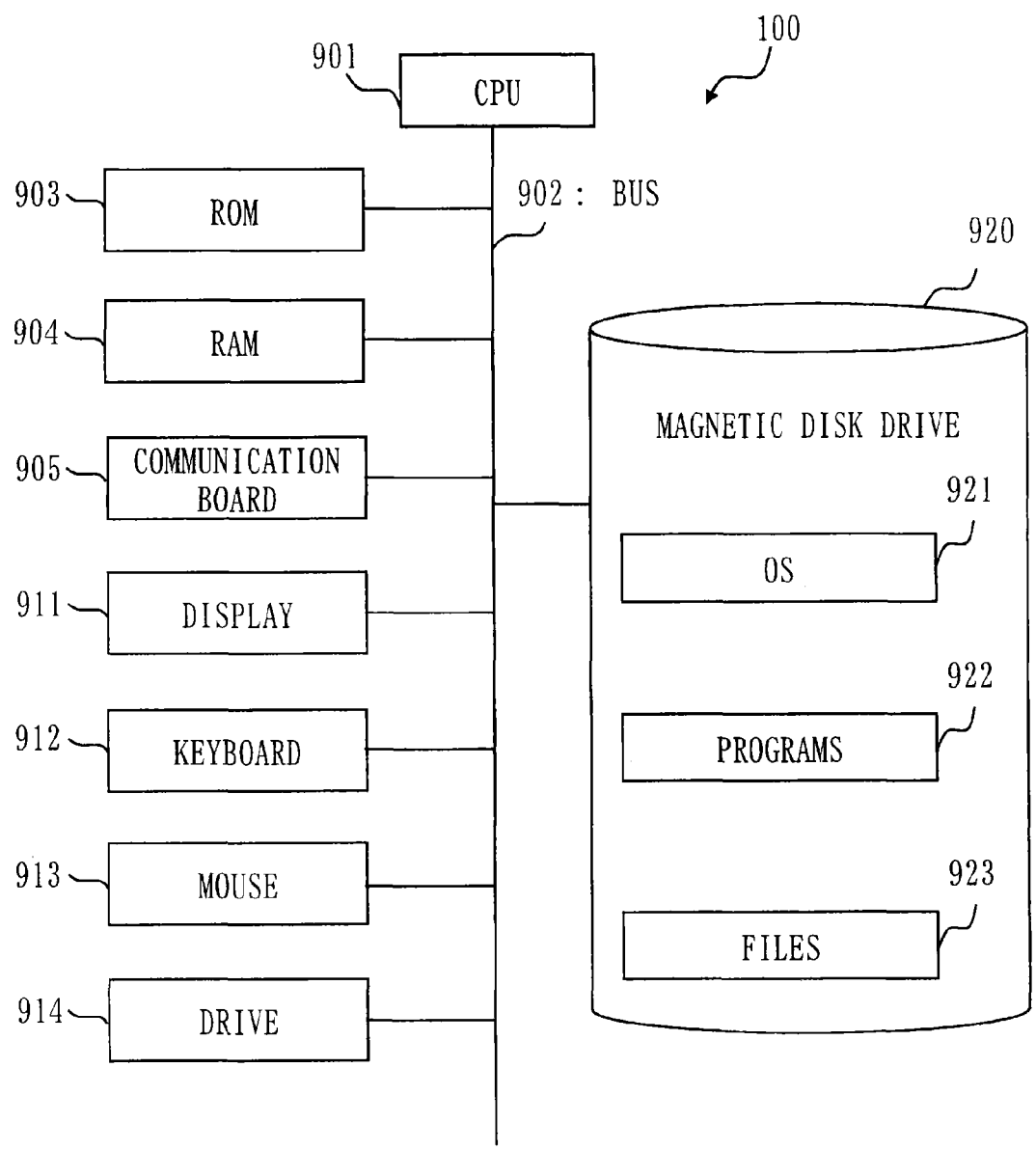
FIG. 41 is a diagram illustrating an example of hardware resources of the program verification apparatus 100 in the first embodiment.

FIG. 41 is a diagram illustrating an example of hardware resources of the program verification apparatus 100 in the first embodiment.

Referring to FIG. 41, the program verification apparatus 100 (an example of a computer) includes a CPU 901 (Central Processing Unit). The CPU 901 is connected to hardware devices such as a ROM 903, RAM 904, a communication board 905 (communication device), a display 911 (display device), a keyboard 912, a mouse 913, a drive 914, and a magnetic disk drive 920 through a bus 902 to control these hardware devices. The drive 914 is a device that reads or writes a storage medium such as an FD (Flexible Disk), a CD (Compact Disc), or a DVD (Digital Versatile Disc).

The ROM 903, the RAM 904, the magnetic disk device 920, and the drive 914 are each an example of a storage device. The keyboard 912, the mouse 913, the communication board 905, and the storage device are an example of an input device. The display 911, the communication board 905, and the storage device are an example of an output device.

The communication board 905 is connected to a communication network such as a LAN (Local Area Network), the Internet, or a telephone line by wire or wirelessly.

An OS 921 (operating system), programs 922, and files 923 are stored in the magnetic disk drive 920.

A program that executes a function described as a "unit" in explanation of the embodiment is included in the programs 922. The program (such as the program verification program) is read and executed by the CPU 901. That is, the program causes the computer to function as the "unit", and also causes the computer to execute the procedure or the method of the "part".

Various data (of an input, an output, a determination result, a calculation result, a processing result, and so forth) to be used by the "unit" described in the embodiment are included in the files 923.

Arrows of the configuration diagrams and the flow charts used in the embodiment show inputs and outputs of data and signals.

The processes in the embodiment described based on the flowcharts are executed by hardware such as the CPU 901, the storage device, the input device, and the output device.

The "part" described in this embodiment may be a "circuit", an "apparatus", or a "device", or a "step", a "procedure", or a "process". Namely, the "part" described herein may be implemented as firmware, software, or hardware, or by a combination of these software, hardware, and firmware.

According to the first embodiment, the following effects, for example, may be achieved.

The program verification apparatus 100 may discover and warn, by static analysis, that protection target information such as confidential information or personal information flows out to an outside of a program as a plaintext or without using an appropriate encryption method.

In other words, the program verification apparatus 100 may verify that "the important information is not output to the outside from the program still as the plaintext" and that "when the important information is encrypted, a key used for the encryption is not hard coded (constantized) within the program".

When the target program 101 is a proper program configured to appropriately encrypt and output the protection target information, the program verification apparatus 100 may prevent erroneous diagnosis that the target program 101 has vulnerability.

A key for encryption or decryption and a password are each an example of the confidential information, and a telephone directory, an address, a mail, positional information and biometric information are each an example of the personal information.

The outside of the program means a network, a different program, a file, a database, or a portable storage medium, or the like, for example.

In the first embodiment, the program verification apparatus (100) as follows, for example, has been described. A reference sign of each component corresponding to the component in the first embodiment is written within a bracket.

The program verification apparatus (100) includes the list storage unit (190), the program input unit (110), the output variable extraction unit (122), the encryption variable extraction unit (123), the encrypted state variable extraction unit (131), the encrypted state determination unit (140), and the verification result output unit (140).

The list storage unit stores the output function list (182) in which an output function for outputting information set to a specific variable is defined and the encrypting function list (183) in which an encrypting function for encrypting the information is defined.

The program input unit inputs a verification target program, as the target program (101) (in step S110).

The output variable extraction unit extracts, as an output variable, the specific variable to which the information to be output by the output function defined in the output function list is set as output information, from among variables used in the target program (in step S122).

The encryption variable extraction unit extracts, as an encryption variable, a variable to which the information encrypted by the encryption function defined in the encryption function list is set as encrypted information, from among the variables used in the target program (in step S123).

The encrypted state variable extraction unit refers to an assignment statement included in the target program, and extracts, from the target program, a variable to which the encrypted information set to the encryption variable extracted by the encryption variable extraction unit is assigned, as an encrypted state variable (in step S200).

The encrypted state determination unit determines whether or not the encrypted state variable extracted by the encrypted state variable extraction unit and the output variable extracted by the output variable extraction unit are the same variable (in step S146-1).

The verification result output unit outputs information based on a result of determination by the encrypted state determination unit, as a verification result of the target program (in step S147).

The list storage unit stores an information acquisition function list (181) in which an information acquisition function for obtaining protection target information being a protection target is defined.

The program verification apparatus includes the protection target variable extraction unit (121) and the protection target determination unit (140).

The protraction target variable extraction unit extracts, as a protection target variable, a variable to which the protection target information obtained by the information acquisition function defined in the information acquisition function list is set, from among the variables used in the target program (in step S121).

The protection target determination unit determines whether or not the protection target variable extracted by the protection target variable extraction unit and the output variable extracted by the output variable extraction unit are the same variable (in step S145).

The verification result output unit outputs information based on a result of determination by the protection target determination unit and the result of determination by the encrypted state determination unit, as the verification result of the target program (in step S147).

The program verification apparatus includes the key variable extraction unit (123) and the key content determination unit (132).

The key variable extraction unit extracts, as a key variable, a variable specified for the encrypting function as one of the variables which is used in the target program and to which an encryption key is set (in step S123).

The key content determination unit refers to the assignment statement included in the target program, and determines whether or not a value assigned to the key variable extracted by the key variable extraction unit as the encryption key is a variable value (in step S300).

The verification result output unit outputs information based on a result of determination by the key content determination unit, the result of determination by the protection target determination unit, and the result of determination by the encrypted state determination unit, as the verification result of the target program (in step S147).

The program verification apparatus includes the key state determination unit (132).

The key state determination unit refers to the assignment statement included in the target program, and determines whether or not the value assigned to the key variable extracted by the key variable extraction unit as the encryption key is a secret value that is made to be secret by being generated by a predetermined secret operation (in step S300).

The verification result output unit outputs information based on a result of determination by the key state determination unit, the result of determination by the key content determination unit, the result of determination by the protection target determination unit, and the result of determination by the encrypted state determination unit, as the verification result of the target program.

REFERENCE SIGNS LIST

100: program verification apparatus, 101: target program, 110: program input unit, 120: necessary information extraction unit, 121: protection target extraction unit, 122: output function extraction unit, 123: encryption function extraction unit, 124: variable information extraction unit, 130: protection state analysis unit, 131: protection target state acquisition unit, 132: key state acquisition unit, 140: vulnerability determination unit, 181: information acquisition function list, 182: output function list, 183: encryption function list, 184: hash function list, 190: verification apparatus storage unit, 191: protection target extraction list, 192: output function extraction list, 193: encryption function extraction list, 194: variable information extraction list, 195: protection target state management table, 196: key state management table, 197: program verification result, 901: CPU, 902: bus, 903: ROM, 904: RAM, 905: communication board, 911: display, 912: keyboard, 913: mouse, 914: drive, 920: magnetic disk drive, 921: OS, 922: programs, 923: files.

The invention claimed is:

1. A program verification apparatus comprising:
a program input circuit that inputs a program using variables, an output function, and an encrypting function and including an assignment statement;
an output variable extraction circuit that extracts from the program an output variable to which output information to be output to an outside from the program by the output function is set;
an encryption variable extraction circuit that extracts from the program an encryption variable to which encrypted information encrypted by the encrypting function is set;
an encrypted state variable extraction circuit that refers to the assignment statement included in the program and extracts from the program an encrypted state variable to which the encrypted information is assigned, the encrypted information being set to the encryption variable extracted by the encryption variable extraction circuit;
an encrypted state determination circuit that determines whether or not the encrypted state variable extracted by the encrypted state variable extraction circuit and the output variable extracted by the output variable extraction circuit are the same variable; and
a verification result output circuit that outputs a verification result of the program, based on a result of determination by the encrypted state determination circuit, wherein when the encrypted state variable and the output variable are not the same variable, the verification result output circuit adds, to the verification result, information indicating that the output information is output to the outside from the program without being encrypted.

2. The program verification apparatus according to claim 1, wherein the program verification apparatus comprises:

a protection target variable extraction circuit that extracts, from among the variables used in the program, a protection target variable to which protection target information obtained by an information acquisition function is set; and a protection target determination circuit that determines whether or not the protection target variable extracted by the protection target variable extraction circuit and the output variable extracted by the output variable extraction circuit are the same variable; and wherein the verification result output circuit outputs the verification result of the program, based on a result of determination by the protection target determination circuit and the result of determination by the encrypted state determination circuit.

3. The program verification apparatus according to claim 2, wherein the program verification apparatus comprises:

a key variable extraction circuit that extracts, from the variables used in the program, a key variable to which an encryption key to be used by the encrypting function is set; and a key content determination circuit that refers to the assignment statement included in the program and determines whether or not a value assigned to the key variable extracted by the key variable extraction circuit as the encryption key is a variable value; and wherein the verification result output circuit outputs the verification result of the program, based on a result of determination by the key content determination circuit, the result of determination by the protection target determination circuit, and the result of determination by the encrypted state determination circuit.

4. The program verification apparatus according to claim 3, wherein the program verification apparatus comprises:

a key state determination circuit that refers to the assignment statement included in the program and determines whether or not the value assigned to the key variable extracted by the key variable extraction circuit as the encryption key is a secret value to be made secret by a secret operation; and wherein the verification result output circuit outputs the verification result of the program based on a result of determination by the key state determination circuit, the result of determination by the key content determination circuit, the result of determination by the protection target determination circuit, and the result of determination by the encrypted state determination circuit.

5. The program verification apparatus according to claim 1, wherein the program verification apparatus comprises:

a key variable extraction circuit that extracts, from the variables used in the program, a key variable to which an encryption key to be used by the encrypting function is set; and a key content determination circuit that refers to the assignment statement included in the program and determines whether or not a value assigned to the key variable extracted by the key variable extraction circuit as the encryption key is a variable value; and wherein the verification result output circuit outputs the verification result of the program, based on a result of determination by the key content determination circuit and the result of determination by the encrypted state determination circuit.

6. The program verification apparatus according to claim 1, wherein the program verification apparatus comprises:

a key variable extraction circuit that extracts, from the variables used in the program, a key variable to which an encryption key to be used by the encrypting function is set; and a key state determination circuit that refers to the assignment statement included in the program and determines whether or not a value assigned to the key variable extracted by the key variable extraction circuit as the encryption key is a secret value to be made secret by a secret operation; and wherein the verification result output circuit outputs the verification result of the program, based on a result of determination by the key state determination circuit and the result of determination by the encrypted state determination circuit.

7. A program verification method that uses a computer, the program verification method comprising:

inputting a program that uses variables, an output function, and an encrypting function and includes an assignment statement;

extracting, from the program, an output variable to which output information to be output to an outside from the program by the output function is set;

extracting, from the program, an encryption variable to which encrypted information encrypted by the encrypting function is set;

referring to the assignment statement included in the program and extracting, from the program, an encrypted state variable to which the encrypted information is assigned, the encrypted information being set to the encryption variable extracted;

determining whether or not the encrypted state variable extracted and the output variable extracted are the same variable;

outputting a verification result of the program, based on a result of determination; and adding, to the verification result, information indicating that the output information is output to the outside from the program without being encrypted, when the encrypted state variable and the output variable are not the same variable.

8. A non-transitory computer readable medium including a program verification program for causing a computer to execute the program verification method according to claim 7.

* * * * *